April 13, 1926.
F. G. HENRY
1,580,247
BLADE PACKAGING MACHINE
Filed July 30, 1921
17 Sheets-Sheet 5
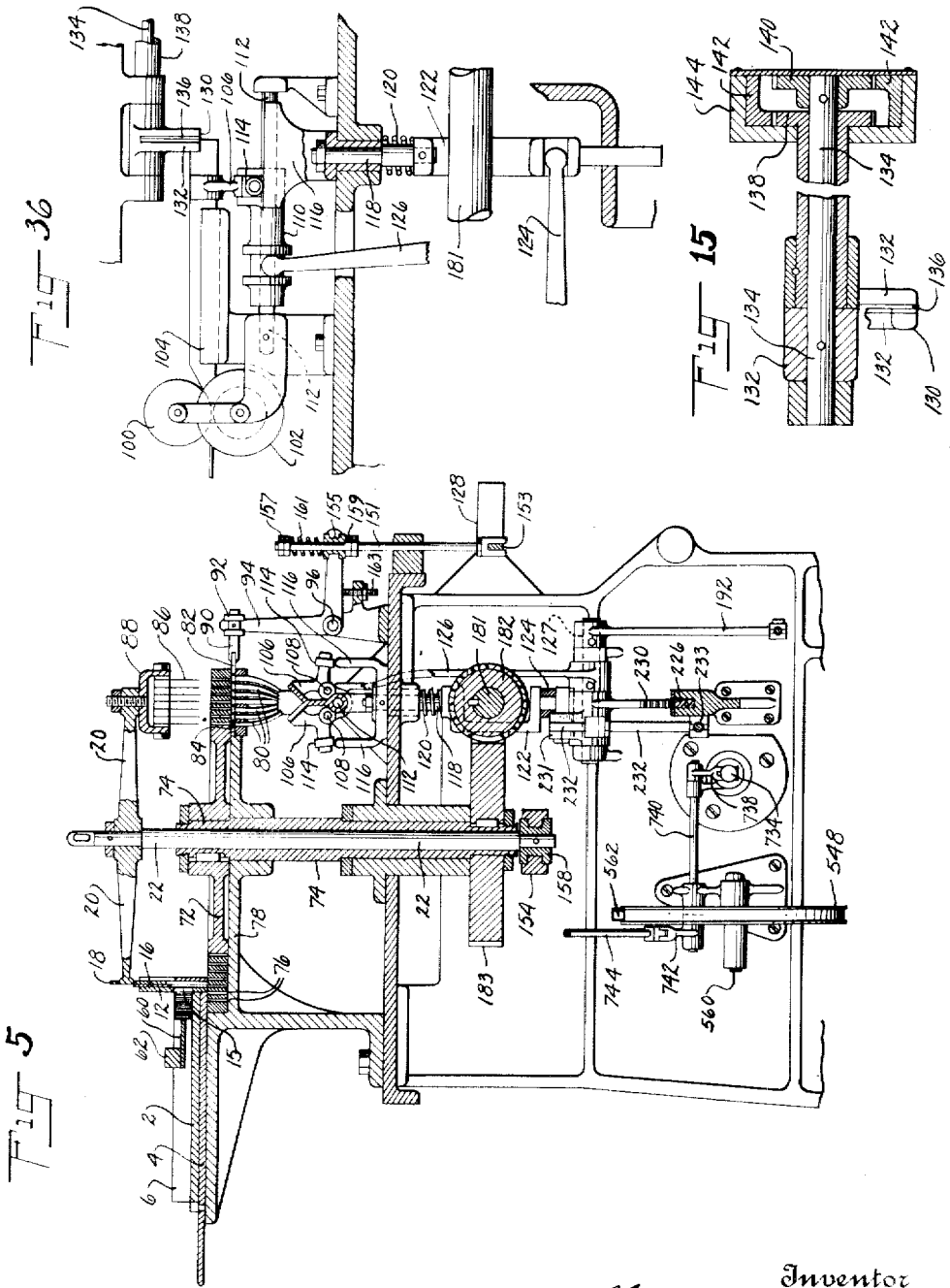

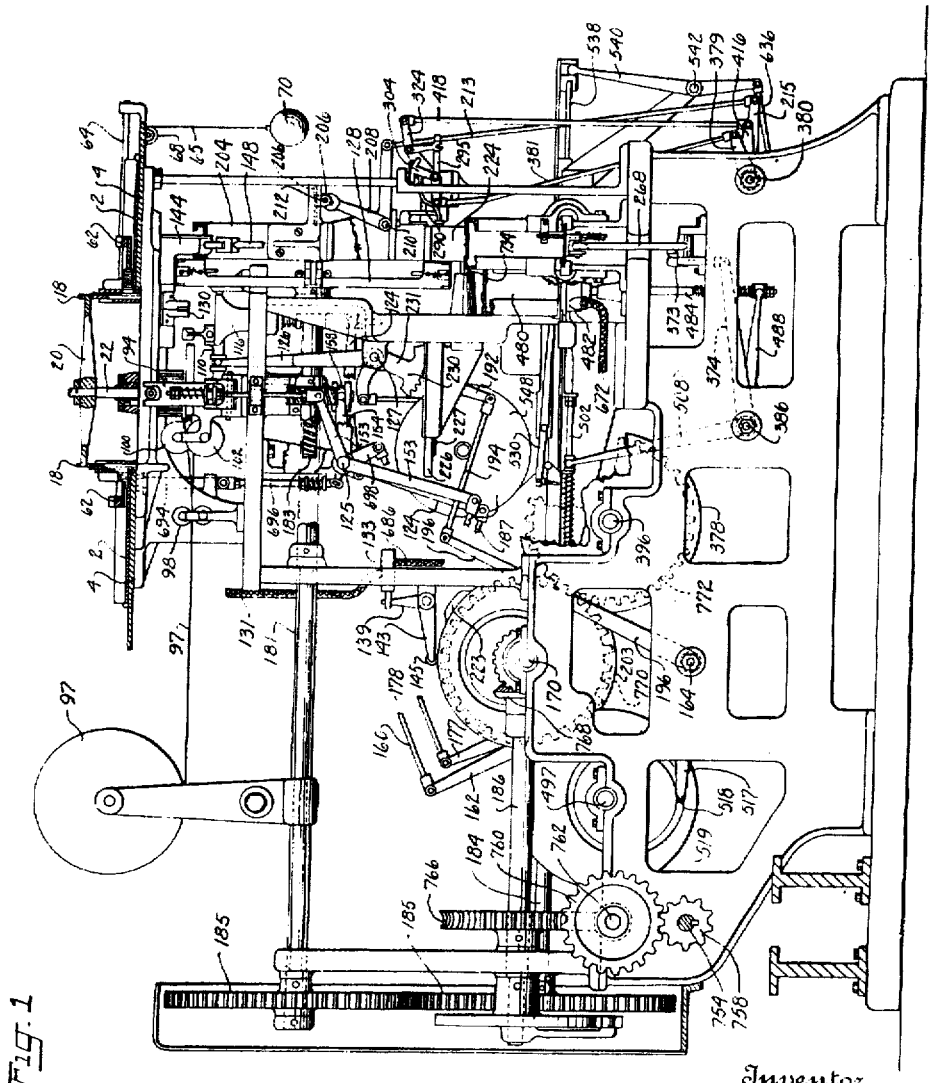

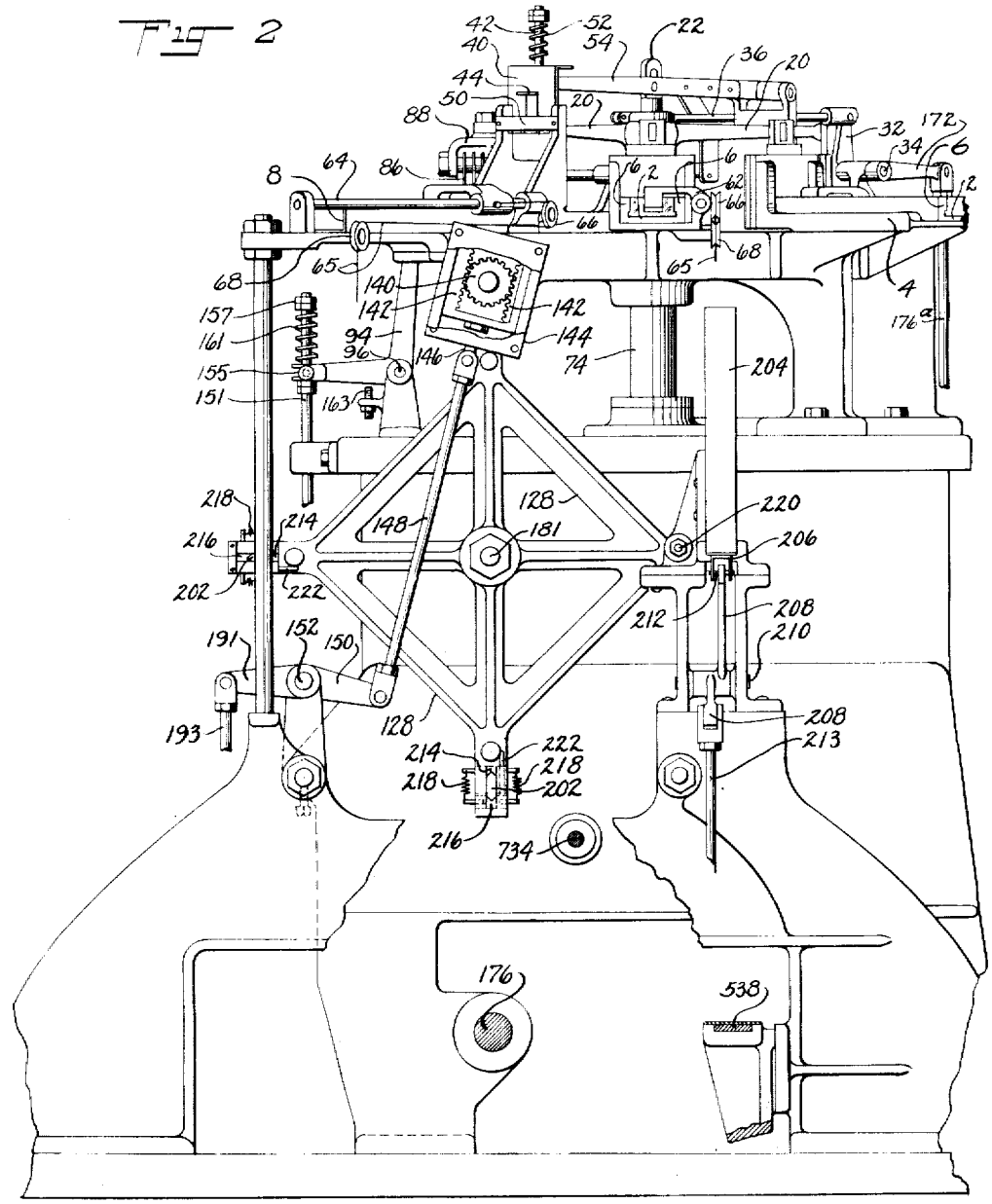

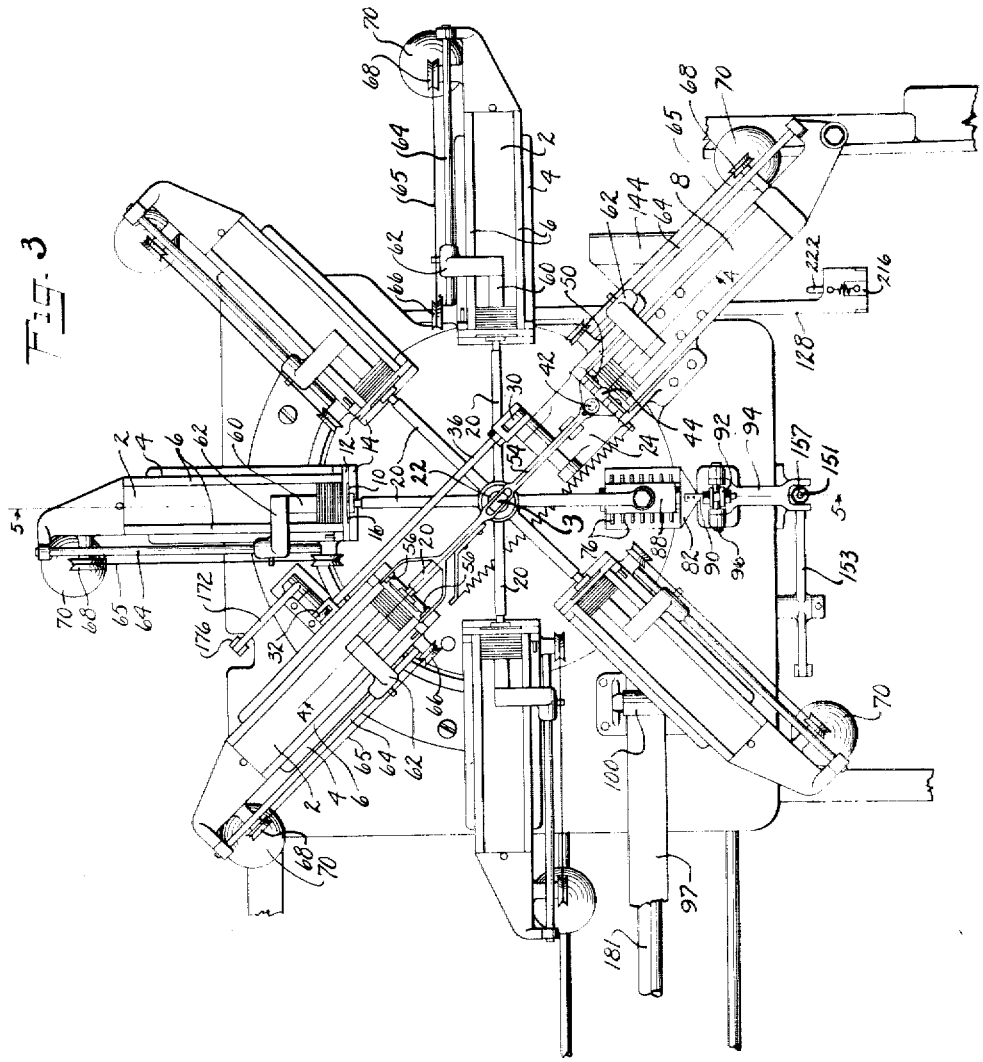

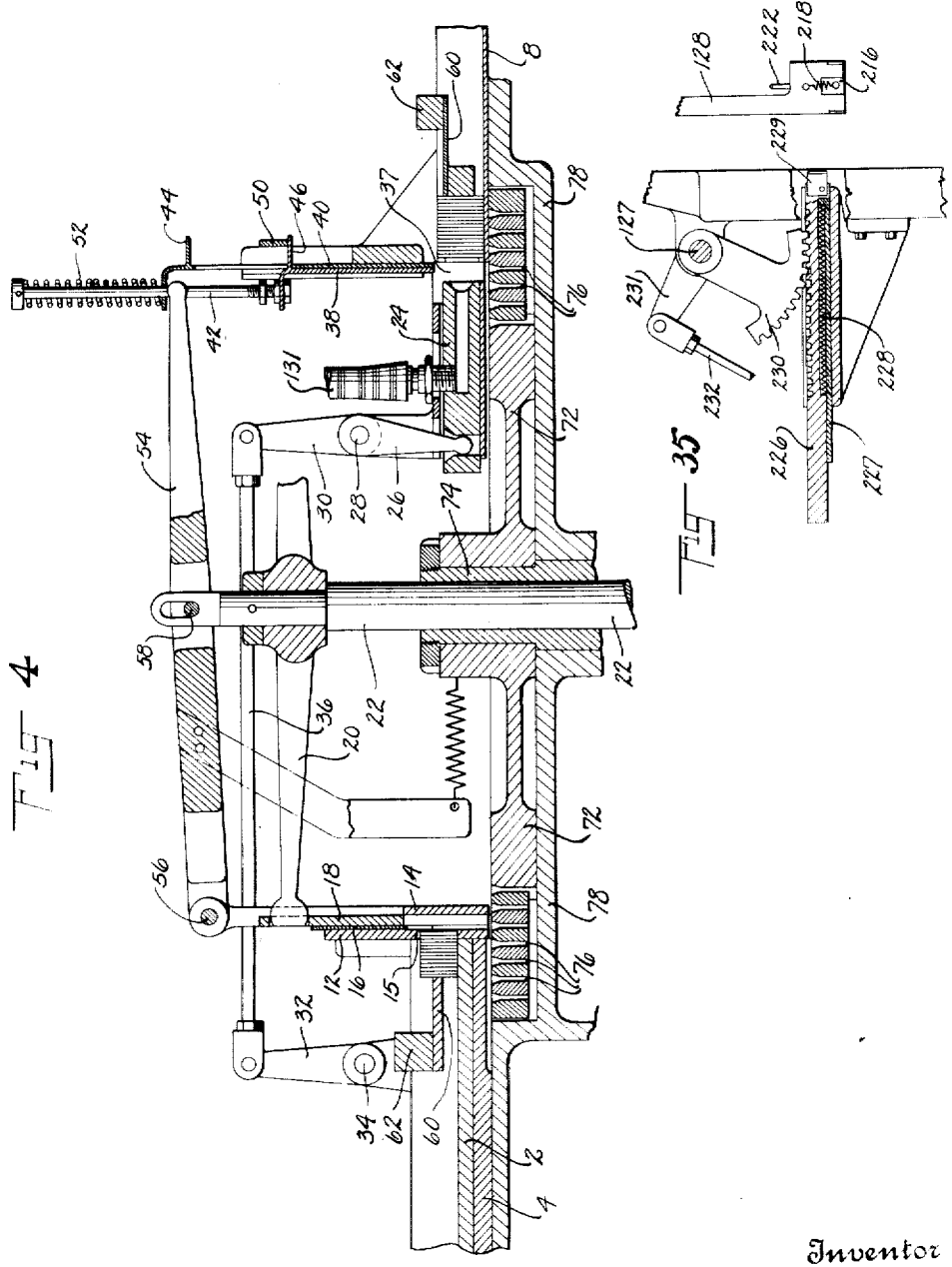

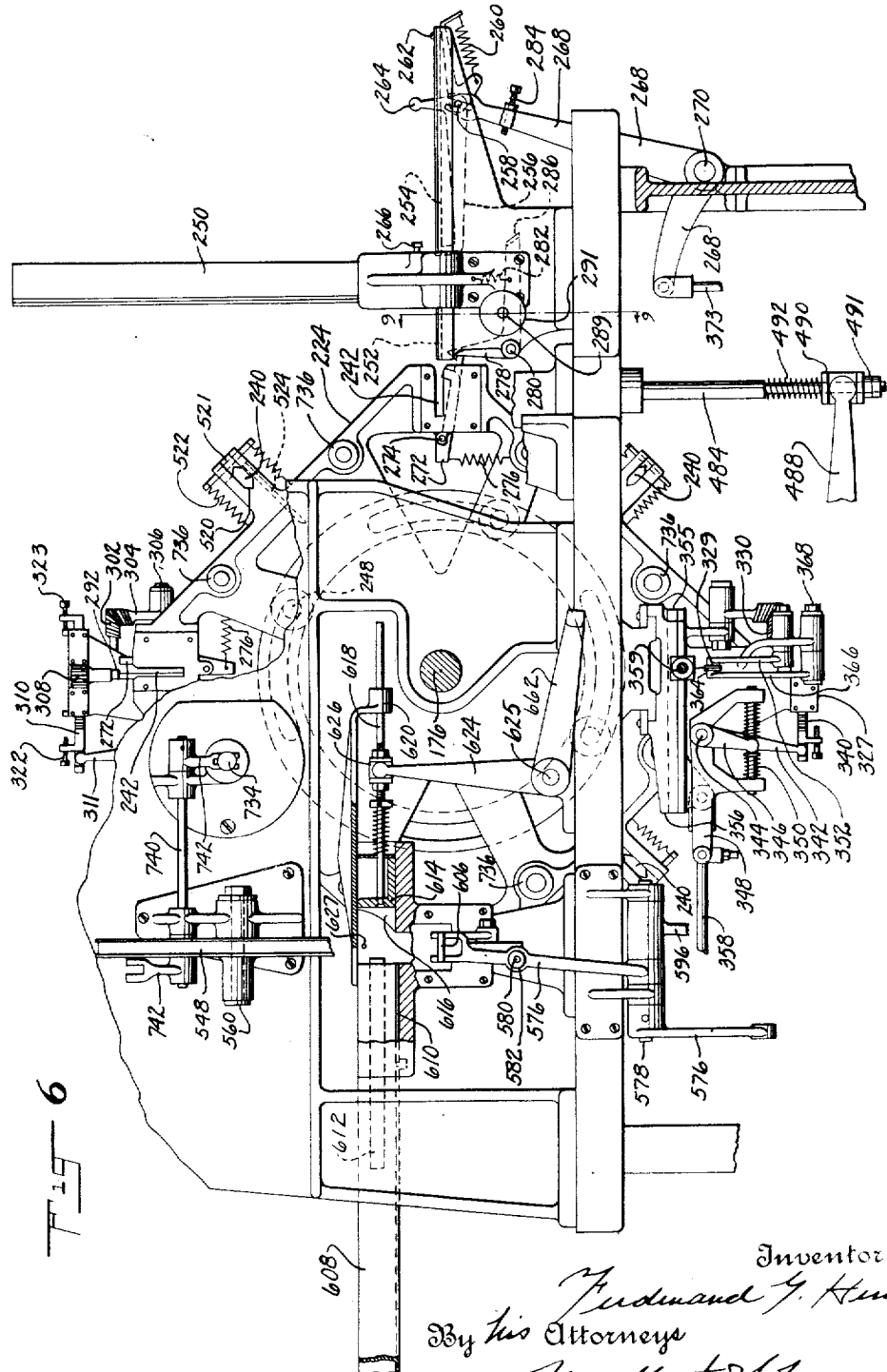

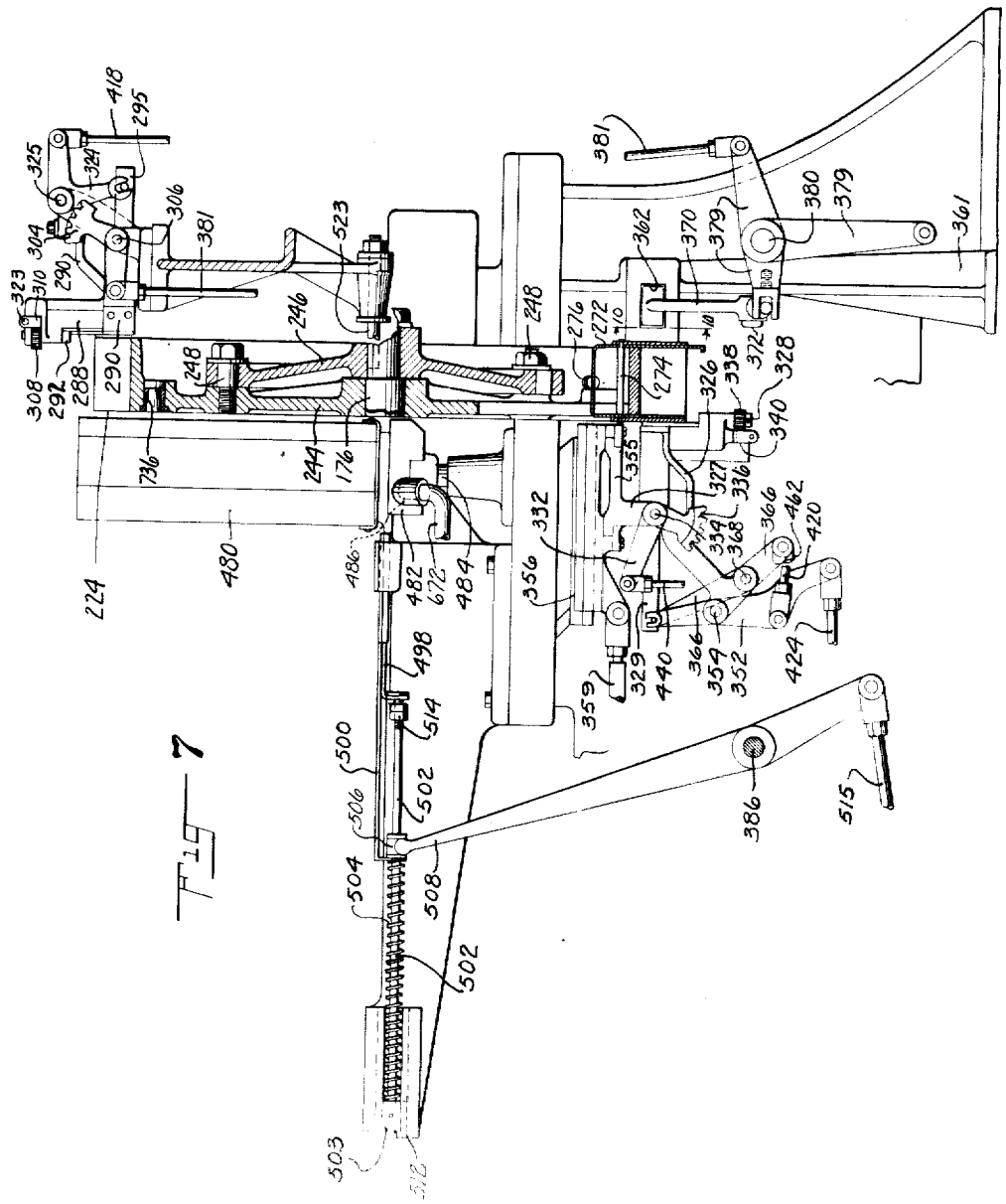

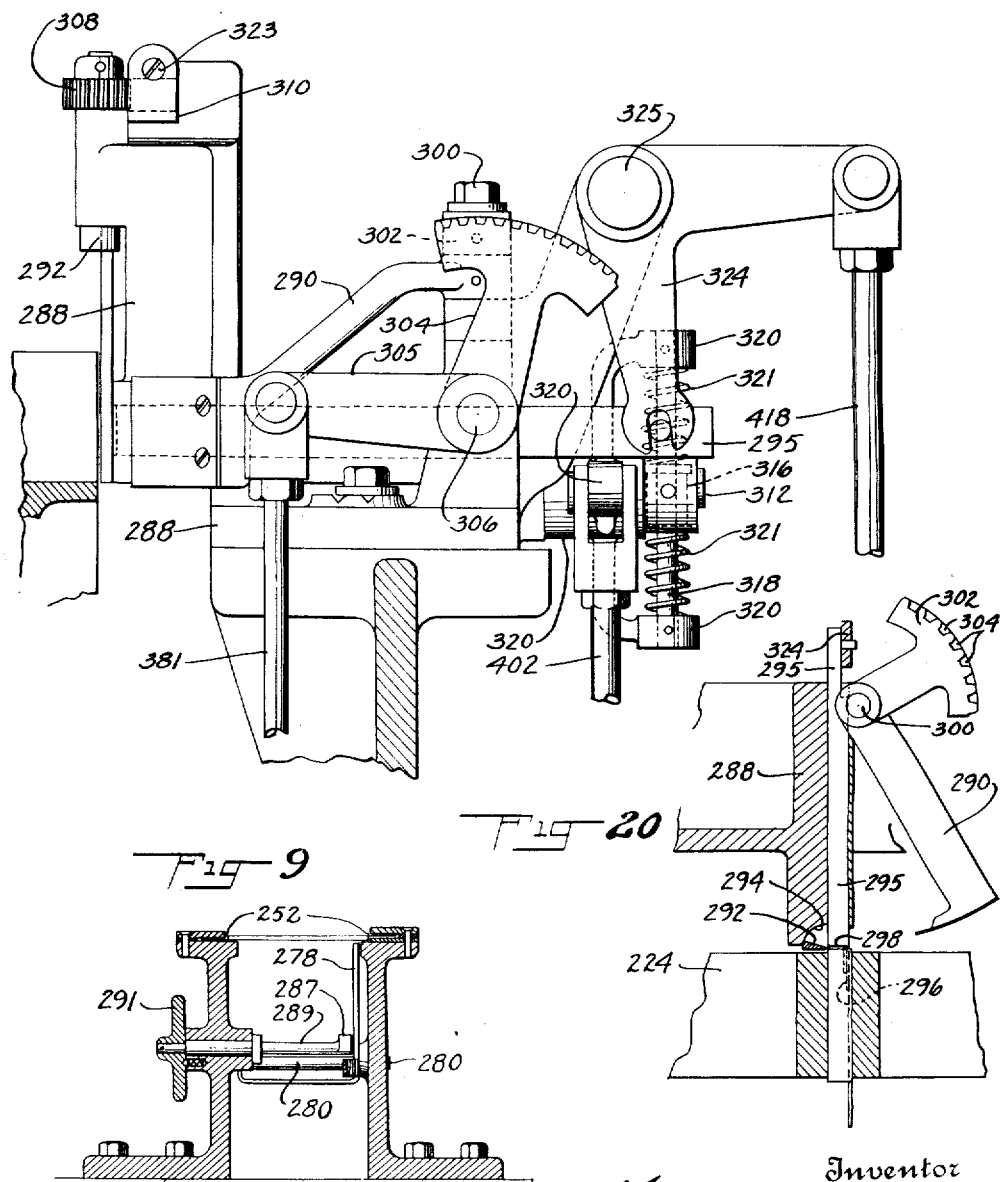

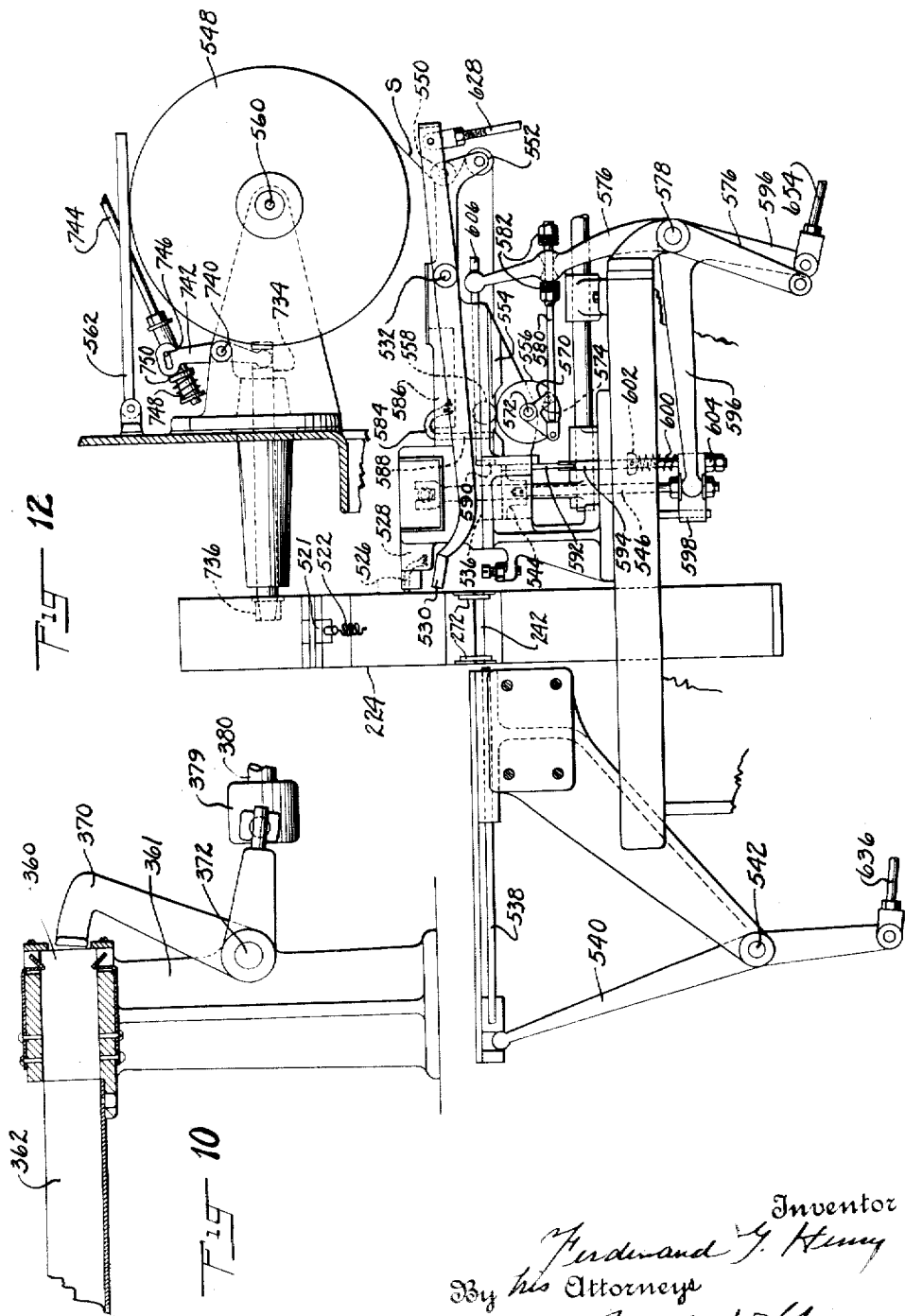

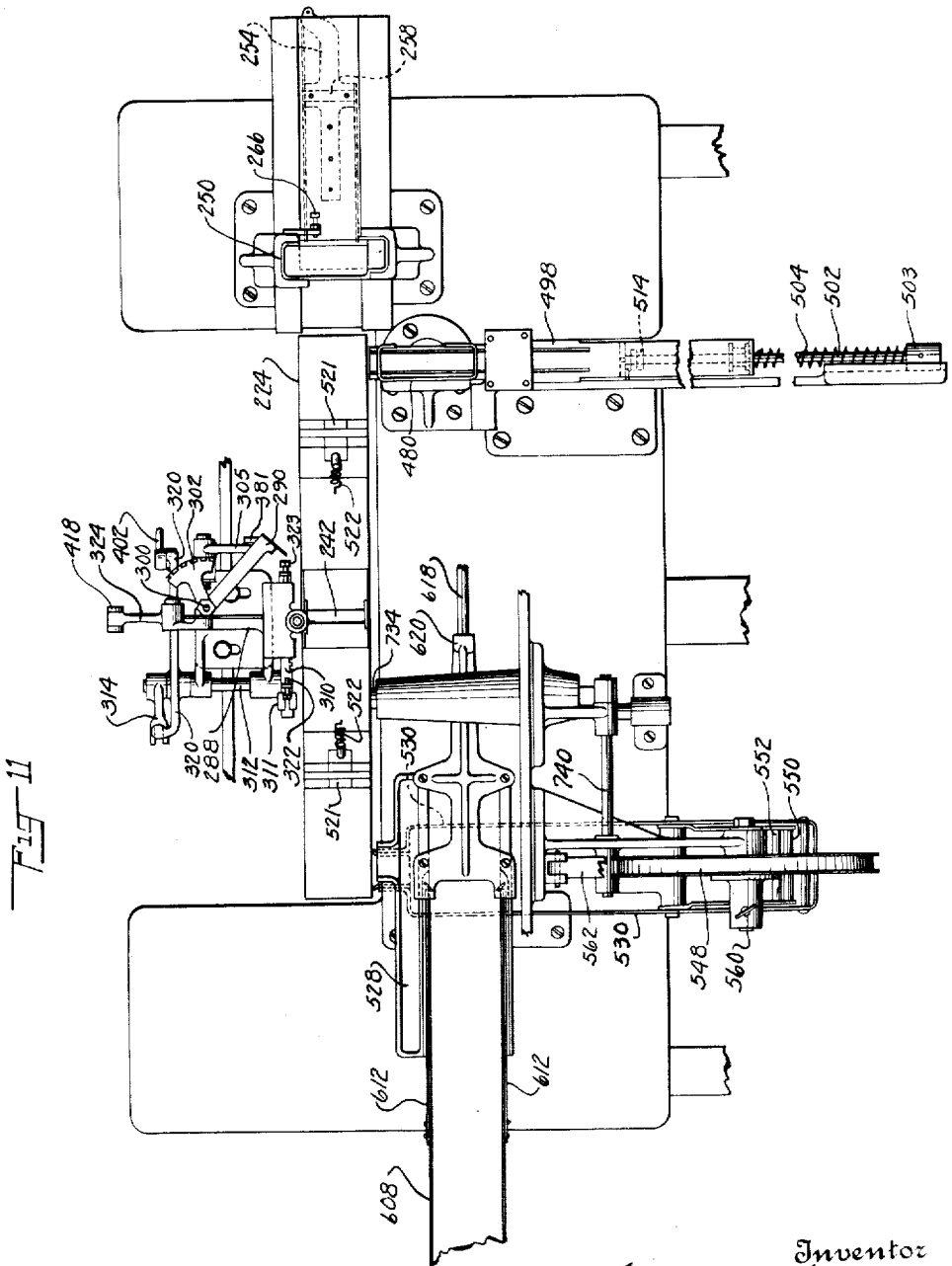

April 13, 1926.
F. G. HENRY
1,580,247
BLADE PACKAGING MACHINE
Filed July 30, 1921    17 Sheets-Sheet 11
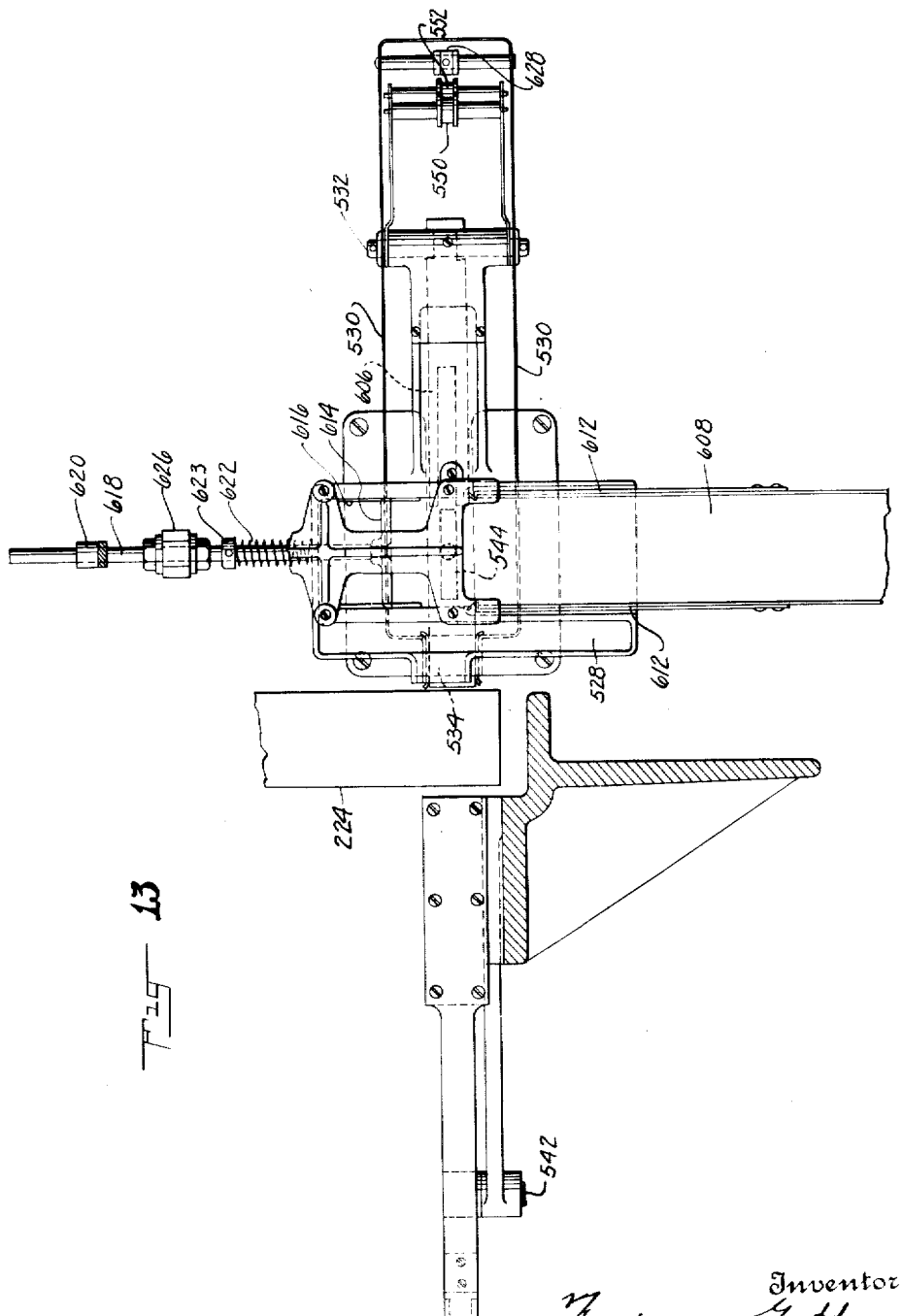

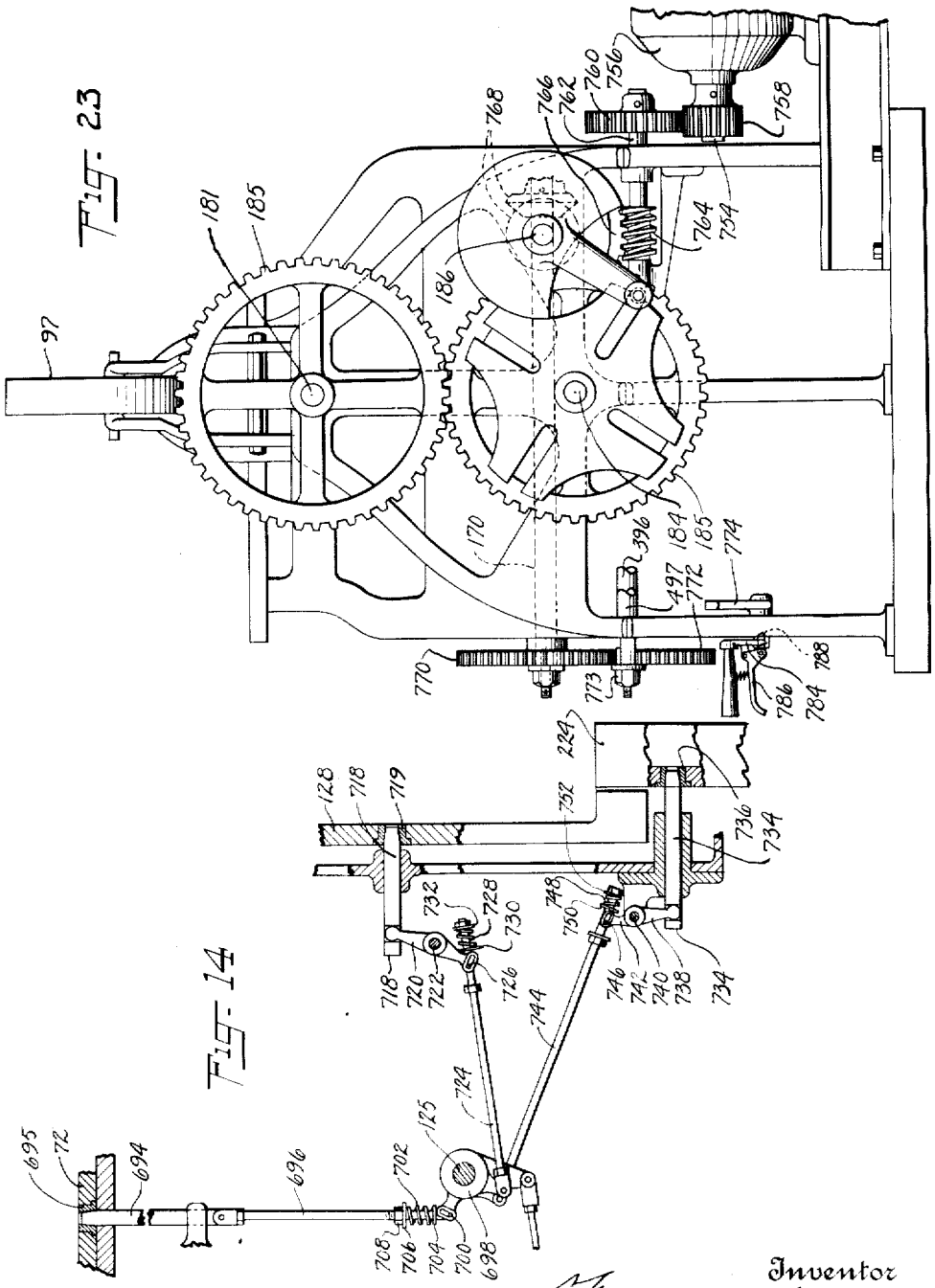

April 13, 1926.
F. G. HENRY
1,580,247
BLADE PACKAGING MACHINE
Filed July 30, 1921 17 Sheets-Sheet 13
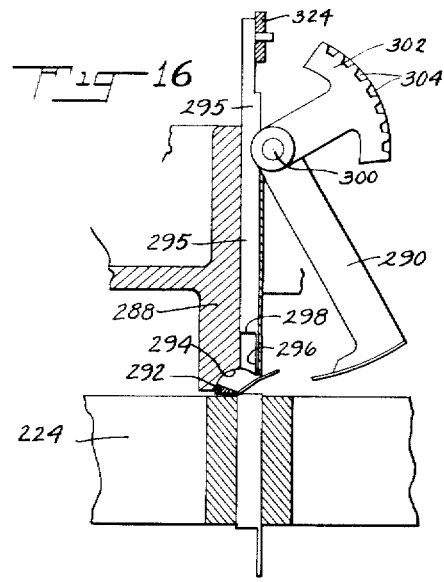
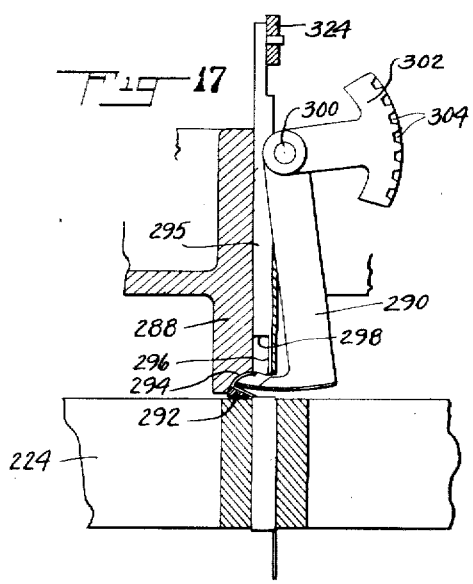
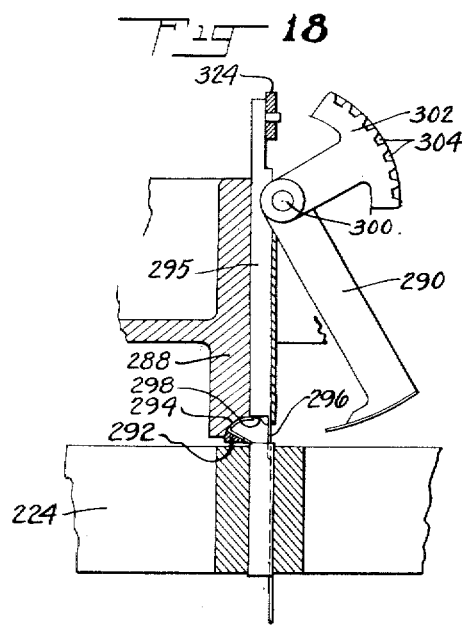
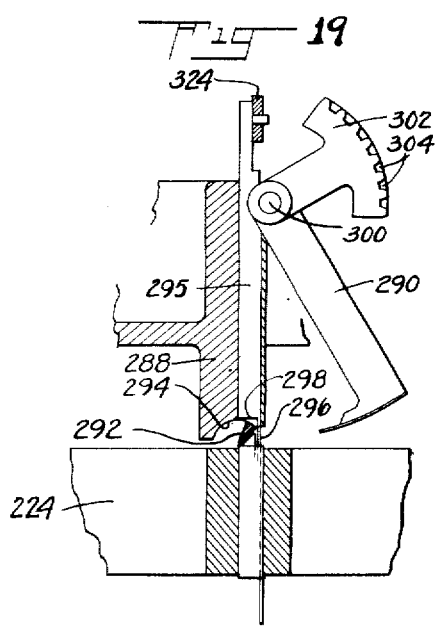

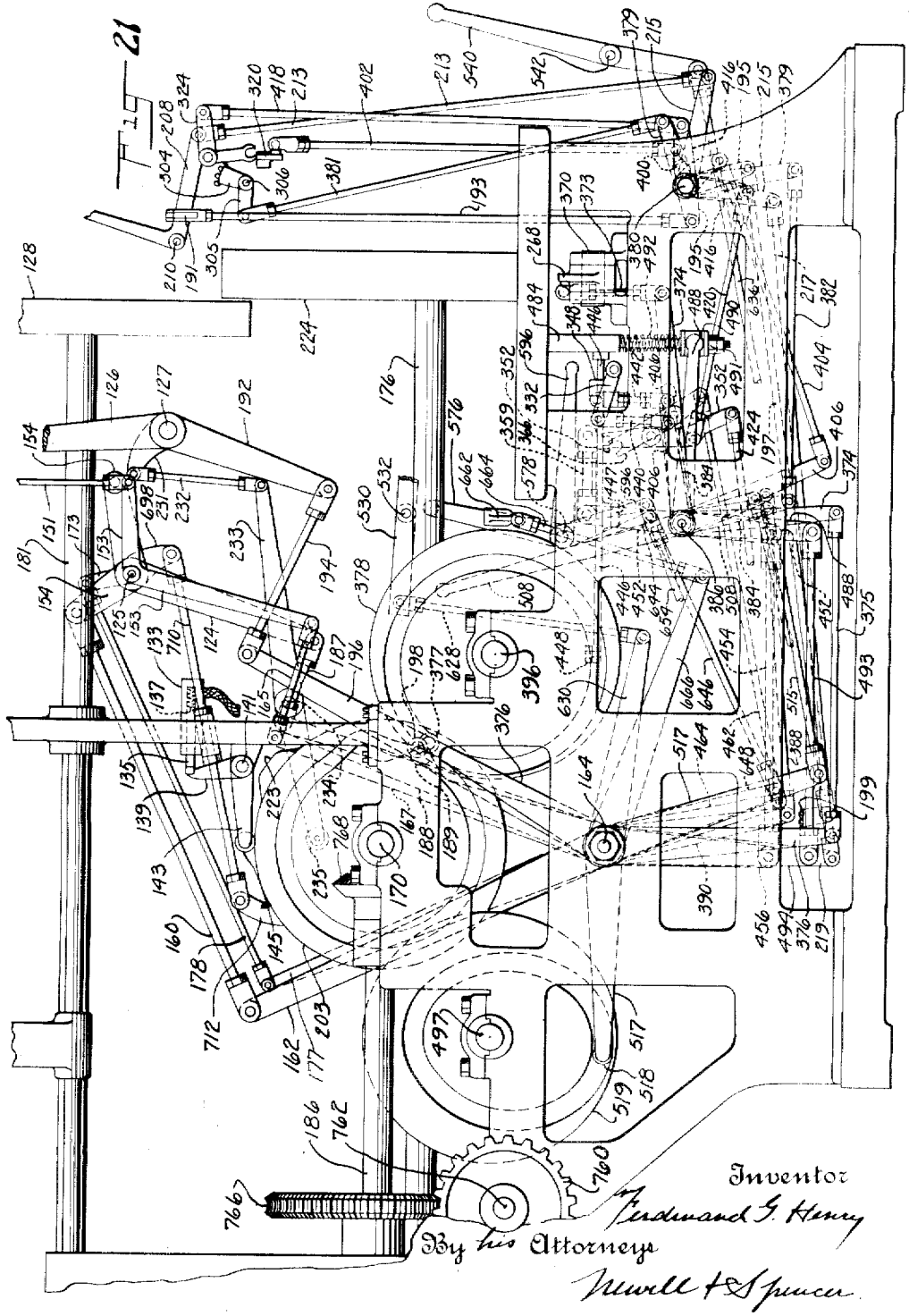

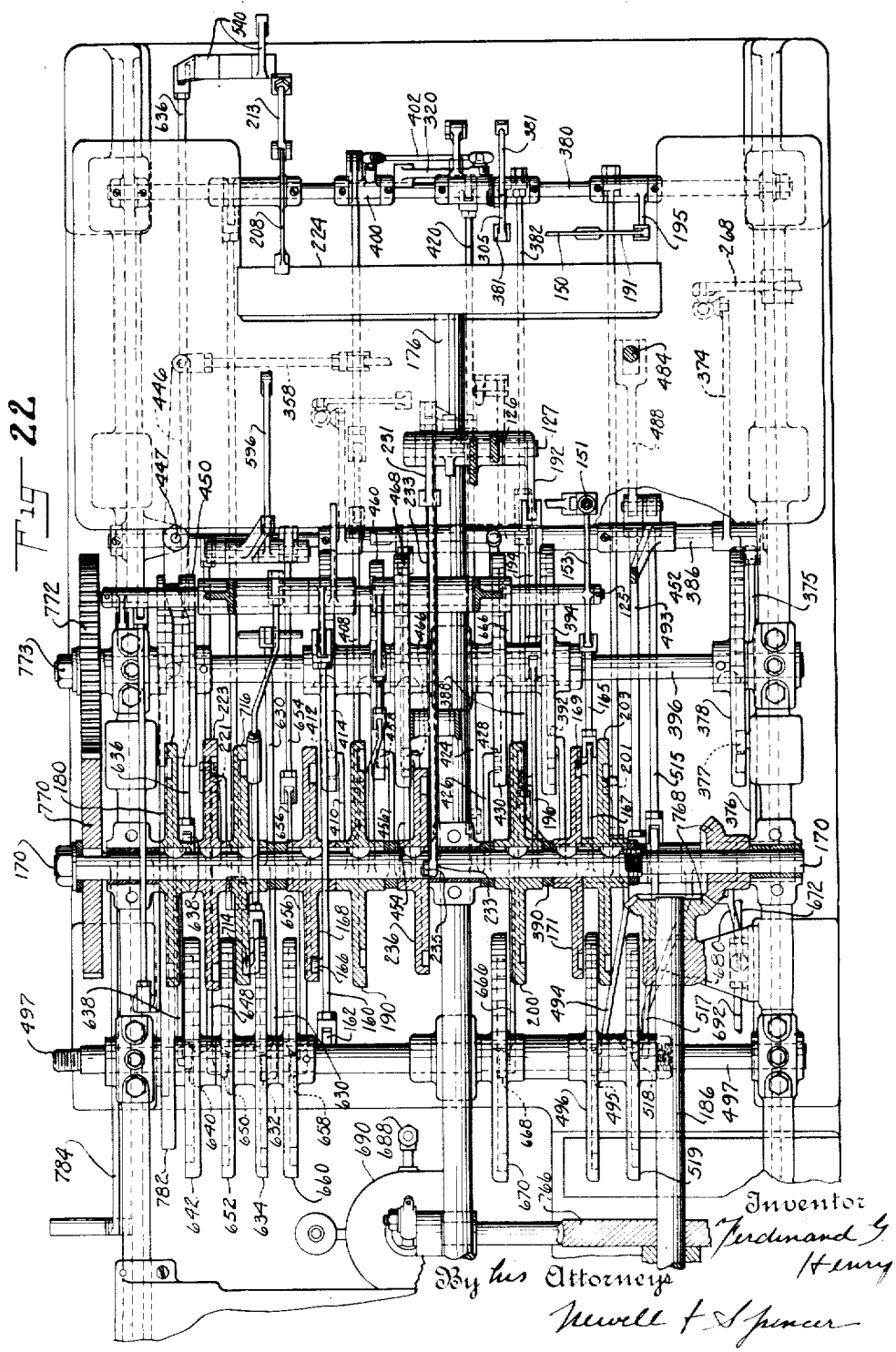

April 13, 1926.
F. G. HENRY
1,580,247
BLADE PACKAGING MACHINE
Filed July 30, 1921     17 Sheets-Sheet 16
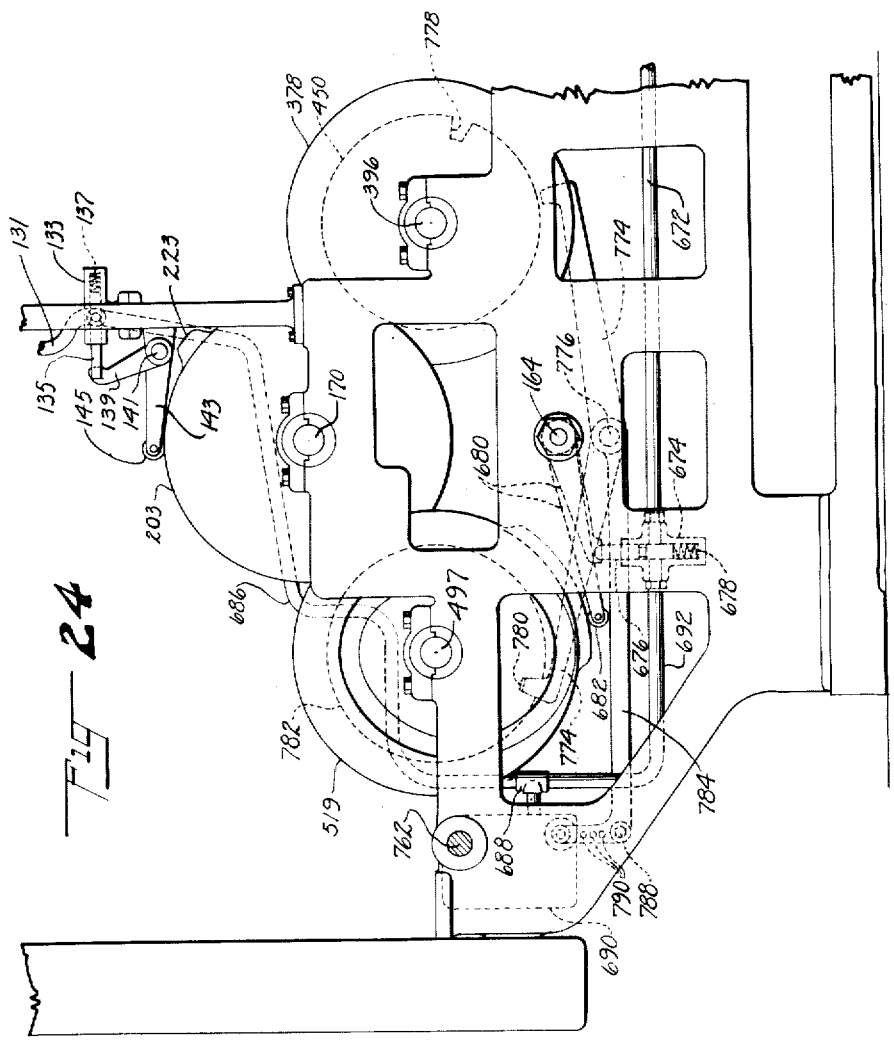
Inventor
Ferdinand G. Henry
By his Attorneys
Newell & Spencer April 13, 1926.
F. G. HENRY
BLADE PACKAGING MACHINE
Filed July 30, 1921
1,580,247
17 Sheets-Sheet 17
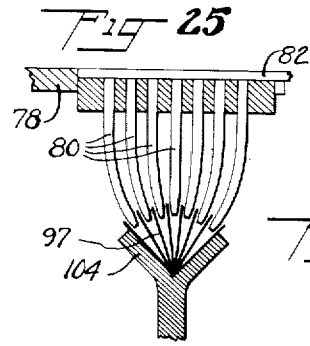
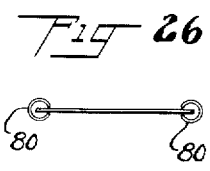
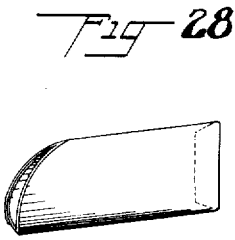
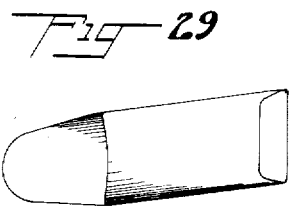
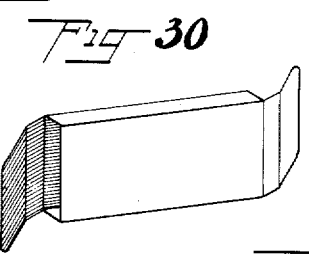
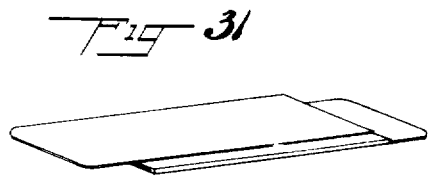
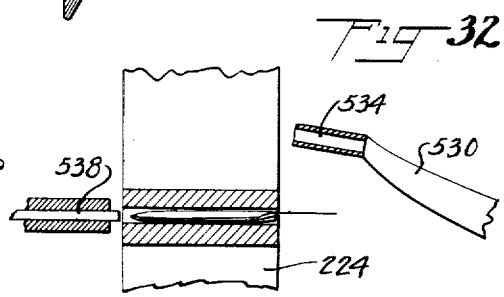
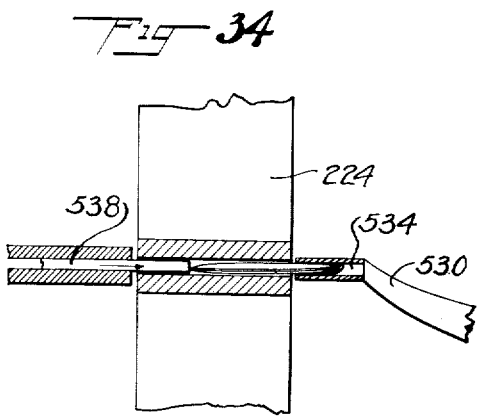
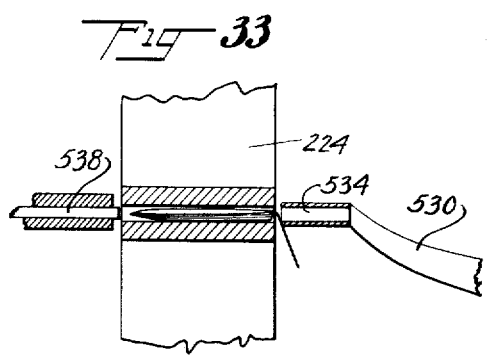
Inventor
Ferdinand G. Henry
By his Attorneys
Newell & Spencer Patented Apr. 13, 1926.

1,580,247

UNITED STATES PATENT OFFICE.

FERDINAND G. HENRY, OF NORTH PHILADELPHIA, PENNSYLVANIA, ASSIGNOR, BY MESNE ASSIGNMENTS, TO WALDEN KNIFE COMPANY, OF WALDEN, NEW YORK, A CORPORATION OF NEW YORK.

BLADE-PACKAGING MACHINE.

Application filed July 30, 1921. Serial No. 488,608.

*To all whom it may concern:*

Be it known that I, FERDINAND G. HENRY, a citizen of the United States, residing at 2908 North 26th St., North Philadelphia, Pennsylvania, have invented certain new and useful Improvements in Blade-Packaging Machines, of which the following is a clear, full, and exact description.

This invention relates to machines for packaging articles and more particularly to machines for placing safety razor blades or similar articles in packages suitable for handling and vending the same.

One object of the present invention is to improve the construction and mode of operation generally of packaging machines of this class and to produce a packaging machine in which the operations are performed automatically to a maximum degree.

Another object of the invention is to produce a blade packaging machine which will operate to insert the blades between the leaves of a book and place the book filled with blades within an envelope or other suitable wrapper or enclosing member.

With these and other objects in view, the invention comprises the novel and improved features, constructions and combinations of parts hereinafter described and particularly pointed out in the claims, the advantages of which will be readily understood and appreciated by those skilled in the art.

In the present embodiment of the invention, the machine is constructed and arranged to insert the blades between the leaves of a book, then to place the book filled with blades in an envelope, and finally to insert the filled envelope within a second envelope or a box.

The invention will be clearly understood from the accompanying drawings illustrating a machine embodying the invention in its preferred form, and the following detailed description of the constructions therein shown.

In the drawings—

Fig. 1 is a view in front elevation of a portion of a machine embodying the invention;

Fig. 2 is a view in side elevation of a portion of the machine;

Fig. 3 is a plan view of a portion of the machine;

Fig. 4 is a sectional view taken substantially on the line 4—4 of Fig. 3;

Fig. 5 is a sectional view taken substantially on the line 5—5 of Fig. 3;

Fig. 6 is a view in side elevation of a portion of the machine;

Fig. 7 is a view partly in front elevation and partly in section of a portion of the machine;

Fig. 8 is a view in front elevation illustrating the mechanism for tucking in one of the flaps of a box;

Fig. 9 is a sectional view taken substantially on the line 9—9 of Fig. 6;

Fig. 10 is a detail view partly in side elevation and partly in section on the line 10—10 of Fig. 7 illustrating the box handling mechanism;

Fig. 11 is a plan view illustrating particularly the mechanisms associated with the lower turret;

Fig. 12 is a view in rear elevation illustrating the mechanisms associated with the lower turret;

Fig. 13 is a plan view illustrating certain of the parts shown in Fig. 11;

Fig. 14 is a detail view illustrating the locking mechanism for the turrets;

Fig. 15 is a detail sectional view illustrating certain parts of the shear mechanism;

Figs. 16, 17, 18, 19 and 20 are diagrammatical views illustrating the action of the mechanisms for tucking in the flaps of a box;

Fig. 21 is a view in front elevation of a portion of the machine illustrating particularly the driving mechanism and the connections for operating certain of the parts;

Fig. 22 is a view partly in plan and partly in horizontal section of the mechanism shown in Fig. 21;

Fig. 23 is a view in side elevation illustrating the driving mechanism;

Fig. 24 is a detail view in front elevation illustrating particularly certain parts of the driving mechanism and certain parts of the air controlling mechanism;

Fig. 25 is a detail view partly in front elevation and partly in section illustrating certain of the parts for inserting blades in the book strip;

Fig. 26 is a detail plan view illustrating certain of the parts for guiding the blades;

Fig. 27 is a detail view illustrating one of the blade actuators;

Fig. 28 is a perspective view of an envelope in which a filled book is inserted;

Fig. 29 is a perspective view of an envelope adapted to form an external wrapper for the envelope shown in Fig. 28;

Fig. 30 is a perspective view of a box adapted to form an external wrapper for the envelope shown in Fig. 28;

Fig. 31 is a perspective view showing the box illustrated in Fig. 30 in collapsed condition;

Figs. 32, 33, and 34 are views partly in rear elevation and partly in section illustrating the operation of closing the flap of the envelope illustrated in Fig. 29;

Fig. 35 is a detail view partly in front elevation and partly in section illustrating the mechanism for transferring a filled envelope from the intermediate turret; and Fig. 36 is a detail view in front elevation illustrating the book strip, supporting and handling mechanism:

In the preferred form of the invention as illustrated in the drawings, the blades to be packaged are held in a series of galleys each constructed to hold a pack or stack of blades placed face to face and are taken in succession from these galleys and inserted between the leaves of a book. In taking the blades from the galleys a predetermined number of blades are assembled in a group, one blade being taken from each galley and the assembled blades are then projected between the leaves of the book.

In the drawings the galleys from which the blades are taken are indicated at 2 and are removably mounted in suitable receiving grooves 4 in the frame of the machine. The number of blade galleys correspond with the number of blades to be inserted in the books and may be varied as desired, the present machine being constructed for the use of six galleys. The receiving grooves are placed so as to locate the galleys in positions with their axis coinciding with the radii of a circle, the center of which is located at 3, Fig. 3.

The galleys are preferably identical in construction and are removably mounted in the receiving grooves 4 so that they may be transferred from one to another of a series of machines for performing successive operations upon the blades, the receiving galley of one machine after being filled with blades being employed as the supply galley of the next machine. The galleys are each provided with a central guideway formed by lateral ribs 6 adapted to receive a series of blades placed face to face.

In addition to the blades, an inspection card preferably is inserted in each book with the blades. These cards are held in a galley 8 similar to the galleys 4 and also mounted with its axis substantially coinciding with one of the radii of the circle, having its center at 3. The card galley however, is preferably permanently secured to the frame of the machine.

The blades from each of the galleys are projected successively from the inner end of th pack in the galley downwardly through a vertical guideway into a suitable turret arranged to rotate below the inner ends of the galleys. These vertical guideways are indicated at 10 and are each formed by a groove in a plate 12 secured to the frame of the machine and a second plate 14 secured in contact with the inner face of the plate 12. The plate 12 is formed with an opening 15 through which the blades are projected from the galley into the guideway 10 by a movement of the blades in a direction substantially normal to the blade plane.

The blades, as they are carried into the guideway 10, are projected downwardly from the guideway into the turret by means of a blade actuator 16 mounted to slide vertically in the guideways and arranged to engage the projections at the opposite ends of the blades to move the blades through the guideway. The blade actuator 16 is secured to a vertically movable slide bar 18, the upper end of which is formed with an opening in which is engaged an arm of a spider 20 secured to the upper end of a vertically movable shaft 22 by the movements of which the blade actuator is actuated in the manner described.

The inspection cards in the card galley 8 are taken from the inner end of the galley and projected downwardly into the turret in a manner somewhat similar to the manner in which the blades are delivered to the turret. The cards are taken in succession from the inner end of the pack in the card galley by means of a reciprocatory slide 24 mounted to slide longitudinally with relation to the card galley and having a suction nozzle at its outer end arranged to be engaged with the inner card of the pack in the galley. The suction nozzle is connected by a series of pipes with a suitable suction fan, all of which will be hereinafter described. The slide 24 is reciprocated by means of an arm 26 secured to a rock shaft 28, an arm 30 also secured to the said rock shaft, an arm 32 secured to a second rock shaft 34, and a link 36 connecting the arm 30 with the arm 32. The rock shaft 34 is actuated through certain connections from a cam shaft hereinafter to be described to impart the proper reciprocating movements to the slide 24.

The card galley 8 is provided at its inner end with detents engaging the ends of the inner card of the pack therein to hold the same in position. As the slide 24 draws the card inwardly, the ends of the card bend until the card is carried past these projections.

Each card after being drawn from the inner end of the card galley is released by the slide 24 by the throwing off of the suction. After its release by the slide, the card rests in a chamber 37 just beyond the inner end of the galley. While within this chamber the card is engaged by a vertically movable slide 38 and pushed downwardly from the chamber into the turret. Before the card is engaged by the slide 38, however, a backing plate or gate 40 is projected downwardly into a position just outside of the card to prevent the card from being deflected laterally, buckling or becoming jammed. The slide 38 is mounted in guides in the frame and to the upper end thereof is secured a rod 42. The backing plate 40 is also mounted in guides to slide face to face, with the slide 38 and is formed at its upper end with a laterally bent portion through which the rod 42 passes. The downward movement of the backing plate 40 is limited by means of a stop 44 formed thereon and arranged to engage a stop plate 50 formed on the frame, and the upward movement of the slide 38 is limited by means of a stop 46 formed on the slide and projecting through a slot in the backing plate 40 into position to engage the stop plate 50. A coiled spring 52 is mounted on the rod 42 and is interposed between the upper end of the backing plate 40 and a collar secured to the upper end of the rod. The slide 38 and the backing plate 40 are actuated, and controlled from a lever 54 pivoted at 56 on the frame of the machine and connected with the shaft 22 by means of a pin 58 secured in the lever and engaging in a slot formed in the upper end of the shaft. The outer end of the lever 54 is arranged to engage beneath the inwardly bent end of the backing plate 40 and is also arranged to engage the upper side of the inwardly bent end of the slide 38. The above mechanism has the following mode of operation starting with the parts substantially in the positions shown in Fig. 4, which is the position which the parts assume just after a card is released by the slide 24. As the lever 54 swings downwardly the slide 38 is held up by the spring 52 and the backing plate 40 is moved downwardly by the action of the spring 52, the plate following the lever 54 in its downward movement, until the stop 44 engages the stop plate 50. This movement of the backing plate locates the same in position outside of the card in the chamber 37. As the downward movement of the lever 54 continues, the outer end of the lever engages the slide 38 and moves the same downwardly, thereby projecting the card into the turret. As the lever 54 swings upwardly the slide 38 is first moved upwardly by the action of the spring 52 until the upward movement of the slide is stopped by the engagement of the stop 46 with the stop plate 50. The continued upward movement of the lever then carries the same into engagement with the backing plate 40 and the backing plate is then moved upwardly by the lever against the tension of the spring 52, thereby restoring the parts to the positions shown in Fig. 4.

The blades and the cards are forced along the respective galleys in directions substantially normal to the blade planes to carry the blades successively into the guideways 10 and to carry the cards into the inner end of the card galley by mechanisms all having substantially the same construction and mode of operation. Each of these mechanisms comprises an arm 60 arranged to engage the outer blade or card of the pack in the galley. The arm 60 is secured to a slide block 62 mounted to slide longitudinally on a rod 64 supported at its ends in the frame. To the slide block 62 is secured one end of a cable 65 passing about guide pulleys 66 and 68, to the other end of which cable is secured a weight 70. The weight 70 tends to force the block 62 and the arm 60 toward the inner end of the galley and carries the pack of cards or blades along the galley as these articles are taken successively from the galley.

The turret into which the blades and inspection cards are projected from the several galleys is indicated at 72 and is mounted to rotate on a substantially vertical axis passing through the center 3 of the circle on the radii of which the galleys are arranged. The turret 72 is secured upon the upper end of a hollow shaft 74 mounted to rotate in suitable bearings in the frame and the peripheral portion of the turret extends beneath the guideways 10 and the chamber 37 for the several galleys, as clearly shown in Fig. 4. The peripheral portion of the turret is formed with a number of series or groups of parallel article-receiving slots 76 into which the blades and cards are projected from the galleys, the number of groups in the present construction being one greater than the number of galleys and the number of slots in each series being the same as the number of galleys. During a single rotation of the turret a blade from each galley and an inspection card is dropped in the respective slots 76 in each group in the turret. The corresponding slots in each group are arranged at equal distances from the center of rotation and the guideways 10 and the chamber 37 are arranged at corresponding distances from this center to enable the blades and cards to be projected from the said guideways and the chamber into the turret. The driving mechanism for the turret is constructed and arranged to impart a step by step rotary movement to the turret, the rotary movement of the turret shifting each group of slots from a position opposite one galley to a position opposite the succeeding galley. The blades are held from dropping through the slots by their engagement with a plate 78 formed on the frame of the machine over which the turret rotates.

After each group of slots is filled with blades and inspection card, the group of slots is brought by the rotation of the turret into position over a series of blade chutes 80 extending through an opening in the plate 78 into which the blades and card are discharged from the turret, these chutes corresponding in number with the slots in each group. When a group of slots is brought into position over the chutes 80 the upper ends of the chutes are closed by means of a plate 82 mounted to slide radially beneath the turret and having a series of slots 84 through which the blades and cards may be projected. When a group of slots is first brought to a position over the chutes 80 the plate 82 is located in the position shown in Fig. 5 so that the upper ends of the chutes are closed. After the turret comes to rest in this position the plate 82 is moved inwardly to bring the slots 84 into positions over the respective chutes 80, thereby opening the chutes. The blades and inspection card are then projected downwardly from the slots 76 through the slots 84 into the chutes 80 by means of a series of projector plates 86 arranged to be projected downwardly through the respective slots and force the blades therefrom. The projector plates 86 are secured to a bracket 88 mounted on an arm of the spider 20.

The plate 82 has a rod 90 secured to the outer part thereof upon which is mounted a collar 92 and the plate 82 is reciprocated by means of a bellcrank lever 94 pivoted at 96 on the frame, the upwardly extending arm of which carries pins engaging in a groove in the collar 92. The horizontal arm of the bellcrank 94 is actuated through mechanism hereinafter described to reciprocate the plate 82.

The blades and inspection card are delivered by the chutes 80 between the leaves of a continuous book strip. The book strip is supplied from a roll 97 and is led from the roll between the peripheries of two cylindrical rolls 98 and then passes between two rolls 100 and 102, the former of which is provided with a V-shaped periphery and the latter of which is formed with a V-shaped peripheral recess arranged to receive the periphery of the roll 100. The book strip as it passes between the rolls 100 and 102 is opened preferably at the center thereof. From the rolls 100 and 102 the book strip passes over a support 104 having a V-shaped recess in which the book strip rests and the leaves of the strip are engaged respectively between the chutes 80 so that the blades and advertising card will be deposited between the leaves of the book by the chutes. From the support 104 the book strip passes between the arms of a reciprocatory feeding gripper which operates to feed the book strip longitudinally. This gripper comprises two arms or levers 106, pivoted at 108 on a carrier 110 mounted to slide longitudinally on a rod 112 supported in the frame of the machine. The upper arms of the levers 106 are formed with inclined faces arranged to receive the book strip between them and when these arms are brought together by the pivotal movement of the levers the book strip is gripped by the arms.

After a series of blades have been deposited by the chutes 80 between the leaves of the book strip, the levers are actuated to grip the book strip and the carrier 110 is then moved longitudinally on the rod 112 to the right, Fig. 1, to feed the book strip longitudinally a predetermined distance. The laterally extending arms of the levers 106 carry rolls 114 which are engaged by the upper edges of two spaced plates 116 formed on a bracket secured to the upper end of a shaft 118 mounted to slide vertically in the frame of the machine. By the upward movement of the shaft 118 the levers 106 are actuated to grip the book strip, the levers releasing the book strip upon the downward movement of the shaft. The shaft 118 is normally held in its lowermost position by means of a coiled spring 120. To the lower end of the shaft is secured a bracket 122 and the vertical movements of the shaft are produced and controlled by means of a lever 124 pivoted on a shaft 125, the laterally extending arm of which engages in recesses in said bracket.

The carrier 110 is moved longitudinally on the shaft 112 by means of an arm 126 secured to a rock shaft 127, the upper end of which arm engages between flanges formed on the carrier 110.

By the feeding movement of the feeding gripper the end of the book strip is inserted in an envelope carried by a rotary turret 128 and the book strip is then severed by a pair of shears between the latter turret and the feeding gripper, leaving the severed end of the book strip within the envelope. These shears are indicated generally at 130 in the drawing and comprise levers 132 pivoted on a shaft 134 and carrying shear blades 136 between which the book strip is passed by the feeding movement thereof when the blades are in open position. After the book strip has been inserted in the envelope in the turret 128 the shears are closed, thereby severing the book strip.

One of the levers 132 is secured to the shaft 134, while the other lever is pivoted to swing freely on the shaft and is formed with a cylindrical bearing portion to which is secured a gear 138. The shaft 134 carries a corresponding gear 140 secured thereto and the levers 132 are swung in opposite directions by means of reciprocatory rack bars 142 engaging the respective gears. The rack bars 142 are secured in a rectangular frame 144 to the lower end of which is attached a rod 146 connected by a link 148 with an arm 150 secured to a rock shaft 152. By mechanism hereinafter to be described, the arm 150 is oscillated to reciprocate the frame 144 vertically, thereby actuating the levers 132 of the shear mechanism.

The shaft 22 is reciprocated vertically by means of a lever 154 pivoted on the shaft 125, one arm of which carries pins engaging in a groove in a collar 158 secured to the lower end of the shaft. The other arm of the lever is connected by means of a link 160 with a lever 162 pivoted on a shaft 164 and carrying a cam roll 166 engaging in a groove in a cam disk 168 secured to a cam shaft 170. This cam shaft constitutes one of the main cam shafts of the machine from which a large number of the operating parts derive their motions.

The lever 94 is actuated from a rod 151 connecting said lever with a lever 153 pivoted on the shaft 125. Upon the rod is slidably mounted a collar 155 connected with the horizontal arm of the lever 94 and a coiled spring 161 is interposed between the collar and a washer held longitudinally on the rod by a nut 157. The downward movement of the collar on the rod is limited by a stop nut 159. The movement of the lever 94 produced by the downward movement of the rod 151 is determined by an adjustable abutment screw 163. By the adjustment of this screw the outward movement of the plate 82 is adjusted so that the slots 84 in the plate will be brought to positions in registration with the slots 76 in the turret 72 at the end of the outward movement of the plate. The lever 153 is connected by a link 165 with a lever 167 pivoted on the shaft 164 which carries a cam roll 169 engaging a groove in a cam disk 171 mounted on the shaft 170.

The mechanism for actuating the rock shaft 34 to move the slide 24 comprises an arm 172 secured to the rock shaft, a lever 173 pivoted on the shaft 125 and connected by a link 176ª with the arm 172, and a lever 177 pivoted on the shaft 164 and connected by a link 178 with the lever 173. The lever 177 carries a cam roll 179 which engages in a groove in a cam disk 180 secured to the cam shaft 170.

The nozzle in the slide 24 is connected by a pipe 131 with a valve casing 133 in which is sildably mounted a valve plunger 135 having a groove therein and acted upon by a spring 137 which normally maintains the same in closed position. The movements of the valve plunger are produced and controlled by means of an arm 139 secured to a rock shaft 141 and an arm 143 also secured to the rock shaft and carrying a cam roll 145 engaging the periphery of a cam disk 223 mounted on the cam shaft 170.

The mechanism for rotating the turret shaft 74 comprises a shaft 181 and intermeshing spiral gears 182 and 183 connecting the latter shaft with the turret shaft 74. The shaft 181 is driven from a shaft 184 through intermeshing gears 185 and a rotary step by step movement is imparted to the shaft 184 from a continuously rotating shaft 186, through a Geneva drive mechanism of the usual construction connecting the two shafts, the Geneva mechanism being constructed and arranged so that the shaft 184 is driven through a quarter of a revolution for every revolution of the shaft 186. The gearing connecting the shaft 184 with the turret shaft 74 however, is so proportioned that the turret shaft is driven through one eighth of a revolution during each quarter of a revolution of the shaft 184.

The lever 124 by which the shaft 118 is moved vertically to actuate the feeding gripper is actuated through a link 187 from a lever 188 pivoted on the shaft 164 which carries a cam roll 189 engaging in a groove in a cam disk 190 secured to the shaft 170.

The arm 126 which actuates the carrier 110 is secured to the rock shaft 127 to which is also secured an arm 192 connected by a link 194 with a lever 196 pivoted on the shaft 164. The lever 196 carries a cam roll 198 engaging in a groove in a cam disk 200 mounted on the shaft 170.

The arm 150, through which the shears are operated is secured to a rock shaft 152 to which is also secured an arm 191 connected by a link 193 with a lever 195 pivoted on a shaft 380. The lever 195 in turn is connected by a link 197 with a lever 199 pivoted on the shaft 164 and carrying a cam roll 201 which engages in a groove in a cam disk 203 mounted on the shaft 170.

The turret 128 is secured to the shaft 181, and the gears 185 are both of substantially the same diameter and number of teeth so that the turret is rotated through a quarter of a revolution at intervals.

The turret 128 is formed with a series of slots 202 adapted to receive envelopes into which envelopes the end of the book strip is fed by the feeding grippers as above described. The envelopes before being inserted in the turret are held in a chute 204 adapted to contain a stack of envelopes and located at one side of the turret and adjacent thereto, as clearly shown in the drawings. The envelopes are projected successively from the lower end of the stack in the upright galley or chute 204 by means of a reciprocatory slide 206 mounted to reciprocate transversely of the chute and located in position to engage the lowermost envelope in the stack and push the same from the chute into the turret. The slide 206 is actuated by means of an oscillatory bellcrank lever 208 pivoted at 210 on the frame, the upper arm of which is formed with a slot arranged to receive a pin 212 carried by the slide.

Upon the opposite sides of each of the slots 202 in the turret are mounted envelope gripping jaws 214 and 216, each having V-shaped recesses to receive the edges of the envelope. The jaws 214 and 216 are relatively movable toward and from each other. Before an envelope is inserted in one of the slots 202 the jaws are moved away from each other and after the insertion of an envelope the jaws are moved yieldingly toward each other, thereby gripping the envelope and exerting pressure upon the opposite edges thereof to open the same. In the illustrated construction, each of the inner jaws 214 is fixed and each of the outer jaws 216 is mounted to slide toward and from the fixed jaw and is acted upon by coiled springs 218 which normally hold the latter jaw in its inner position determined by a suitable stop. As the rotation of the turret carries one of the envelope slots 202 into position to receive an envelope from the chute 204, a pin 220 mounted on the frame engages the inner bevelled end of a pin 222 secured in the corresponding outer jaw 216 and the latter jaw is thereby moved outwardly of the turret. As this slot is carried away from the chute 204 after the insertion of an envelope in the slot, the springs 218 move the jaw 216 toward the jaw 214 to grip and open the envelope.

The mechanism for actuating the lever 208 comprises a link 213 connecting said lever with a lever 215 pivoted on the shaft 380. The lever 215 is connected by a link 217 with a lever 219 pivoted on the shaft 164 and carrying a cam roll 221 engaging in a groove in a cam disk 223 mounted on the shaft 170.

The first quarter of a revolution of the turret 128 after an envelope is inserted therein carries the envelope into position to receive the end of the book strip and the book strip is inserted in the envelope and the strip is severed, leaving the book strip projecting slightly from the envelope while the envelope is held by the turret at this point or station. The next quarter of a revolution of the turret carries the envelope into a position at the left of the center of rotation, Fig. 2, but no operation is performed while the envelope is held stationary at this point. The next quarter of a revolution of the turret brings the envelope into position to be discharged from the turret 128 into a box, an envelope or other enclosing member carried by a third rotary turret 224. The envelope is discharged from the turret 128 while the envelope is held at this position or station by means of a reciprocatory slide 226 arranged to engage the end of the envelope or the end of the book projecting therefrom and thus project the envelope from the turret 128. During the engagement of the slide 226 with the book the jaws 214 and 216 exert a certain amount of resistance to the movement of the envelope so that the book is pushed to the end of the envelope during this operation.

In order to prevent the lateral deflection of the envelope as it is engaged by the slide 226, two jaws or plates having a tapered opening between them are advanced upon opposite sides of the envelope to hold the same in position. In the drawing these plates are carried upon the forward end of a slide 227 which is actuated from the slide 226 through a spring 228 interposed between abutments on the two slides. The plates which are indicated at 229 in the drawing are secured to the forward end of the slide 227 and the slide 226 is arranged to pass between the same. As the slide 226 is advanced, the slide 227 is advanced therewith through the spring 228 carrying the plates 229 upon opposite sides of the envelope projecting from the turret 128 and the movement of the slide 227 is limited by the engagement of the plates 229 with the face of the turret. The slide 226 then continues its movement, thereby projecting the envelope from the turret.

The slide 226 is formed with rack teeth which are engaged by a gear segment 230 carried by a lever 231 pivoted loosely on the shaft 127. This lever is connected by a link 232 with a lever 233 pivoted on a shaft 234 and carrying a cam roll 235 engaging in a groove in a cam disk 236 secured to the shaft 170.

The turret 224 which carries the envelopes or boxes is mounted on the shaft 176 so that it is rotated intermittently through a quarter of a revolution with the turret 128. The turret 224 is mounted to rotate by the side of the turret 128 so as to receive the filled envelopes readily from the latter turret. The turret 224 is formed with slots 240 for the reception of envelopes and with slots 242 for the reception of boxes, these sets of slots being located at different points about the turret, as clearly shown in the drawings. To enable either set of slots to be located in operative position, the slotted portion of the turret is mounted so that it may be adjusted about the shaft 176. To this end, the turret is constructed in two parts indicated respectively at 244 and 246 in Fig. 7, of which the part 244 is formed with the envelope and blade receiving slots and is secured to the part 246 for angular adjustment relatively thereto by a series of screws 248 passing through arcuate slots in the part 246 and threaded into part 244, the part 246 being secured to the shaft 176. The part 244 of the turret is shown in the drawings as adjusted for receiving and carrying boxes.

The boxes to be inserted in the turret 224 are held in an upright galley or chute 250 adapted to receive a stack of boxes in a collapsed condition with the end flaps projecting in opposite directions from the bodies of the boxes, the chute being located in substantially the plane of the turret. The boxes are projected in succession from the bottom of the chute 250 through a guideway 252 into one of the slots 242 in the turret, the turret stopping after each rotation with one of the slots 242 in position to receive a box from the guideway. The guideway 252 is formed upon its opposite sides with contracted portions to receive the flaps on the boxes as shown clearly in Fig. 9. The boxes are carried from the chute through the guideway into the turret by means of a slide 254 mounted to reciprocate transversely of the chute and arranged to engage the bottom box in the chute. After a box is projected into one of the slots 242 and its movement is stopped by its engagement with the inner end of the slot, the box is brought to an erect or open position by a device which exerts a further impulse upon the edge of the box. This device in the present construction consists of a lever 256 pivoted on a pin 258 carried by the slide 254, the left hand end of which lever (Fig. 6) is formed with upturned projections normally lying below the slide, the lever being acted upon by a spring 260 which normally holds the lever in this position with the right hand end thereof in engagement with a stop-screw 262 carried by the slide 254.

The lever 256 is formed with a projection 264 which when the slide 254 approaches the limit of its movement toward the left, Fig. 6, engages a stop-screw 266 mounted on a frame thereby lifting the projections on the lever above the left hand end of the slide into position to engage the box, the forward end of the slide being formed with recesses to receive the projections on the lever. The impulse exerted by the lever against the outer edge of the box while the inner edge thereof is engaged with the inner wall of the slot 242 causes the box to assume an erect or open condition. The slide 254 and the lever 256 are reciprocated by means of a bell crank lever 268 pivoted at 270 on the frame, the upwardly extending arm of which is formed with a slot in which engages the pin 258.

As the slide 254 and the lever 256 retract after having projected a box into the slot 242, the box is held in the slot by means of a hooked retaining lever 272 pivoted at 274 on the turret 224 and normally held in retaining position by a coiled spring 276. As a slot 242 is carried by the movement of the turret 224 into receiving position, the outer end of the retaining lever 272 is depressed by the engagement therewith of a bellcrank detent lever 278 pivoted at 280 on the frame and acted upon by a coiled spring 282 which normally holds the upwardly extending arm thereof in position to engage the retaining lever. As the slide 254 and the lever 256 are actuated by the lever 268 to project a box into the slot 242, a set screw 284 mounted in the lever 268 engages an incline 286 on the detent lever and actuates the lever to release the retaining lever 272.

When envelopes are being carried by the turret 224 the lever 278 is held out of operating position by means of an eccentric 287 secured to a pin 289 rotatably adjustable in the frame to which is also secured a hand wheel 291, Fig. 9.

After a box is inserted in one of the slots 242 the next quarter of a revolution of the turret 224 brings the box to the station at which an envelope containing a book filled with blades is inserted in the box. Preferably, however, before this envelope is inserted in the box the flap at the end of the box opposite that into which the envelope is inserted is tucked into the box. As the box is carried to this station the flap at the said end of the box engages the adjacent portion of a bracket 288 secured to the frame of the machine in which bracket the flap tucking mechanism is mounted, the engagement of the flap with the bracket deflecting the flap to a slight degree as shown in Fig. 16. After the turret comes to rest the portion of the flap adjacent the body of the box is engaged by the end of a crimper arm 290 pivoted on the bracket 288 and the flap is deflected into engagement with a sector shaped portion formed on the lower end of a rotatable rod 292. During this movement of the crimper arm the flap is caused to conform substantially to a cylindrical surface 294 formed on the bracket 288 as shown in Fig. 17. The crimper arm 290 is then retracted out of engagement with the flap to substantially the position shown in Fig. 18, and a reciprocatory slide 295 having a blade 296 at its inner end is advanced to insert the blade into the interior of the box as shown in this figure. While the slide 295 is held in the position shown in this figure the rod 292 is rotated in a clockwise direction to insert the end of the flap into the box, the end of the flap following the blade 296. The rod 292 is rotated to substantially the position shown in Fig. 19 to insert the end of the flap in the box and is then turned back to its initial position, thus leaving the flap projecting slightly from the box, as shown in this figure. The slide 295 is then given a further advance movement during which a shoulder 298 on the slide engages the flap and pushes the flap completely into the box, as shown in Fig. 20. The slide 295 is then retracted to its initial position thereby withdrawing the blade 296 from the box.

The crimper 290 is secured to the upper end of a shaft 300 mounted in bearings in the bracket 288 to which is also secured a gear segment 302 meshing with a gear segment 304 formed on one arm of a bellcrank lever 305 pivoted on a stud 306. This bellcrank lever is oscillated through connections hereinafter described to actuate the crimper.

The rod 292 is mounted in bearings in the bracket 288 and carries at its upper end a gear 308 which meshes with the teeth of a rack bar 310 mounted to slide longitudinally in said bracket. The rack bar is formed with a recess in which engages the end of an arm 311 secured to one end of a rock shaft 312. To the opposite end of this rock shaft is secured an arm 314 engaging between flanges formed on a collar 316 slidably mounted on a rod 318 secured at its ends in the spaced arms of a lever 320 mounted to turn freely on the rock shaft 312. Coiled springs 321 are interposed between the collar 316 and the adjacent arms of the lever 320, as shown in Fig. 8, forming a yielding connection between the lever 320 and the arm 314. The movement of the rack bar 310 in both directions is limited to limit the rotary movement imparted to the rod 292 by means of abutment screws 322 and 323 arranged to engage suitable stops formed on the frame. The lever 320 is oscillated to actuate the rod 292 by a mechanism hereinafter to be described.

The slide 294 is actuated by means of a bellcrank lever 324 pivoted at 325 on the bracket 288, one arm of which is formed with a slot in which engages a pin mounted in the outer end of the slide. The lever 324 is actuated, as hereinafter described, to reciprocate the slide.

The next quarter of a revolution of the turret 224 brings the box to a station at which no operation is performed.

The next quarter of a revolution of the turret, however, brings the box to a station at which the other flap is tucked into the end of the box and the box is projected from the turret. The mechanism for tucking this flap into the box has substantially the same construction, arrangement and mode of operation of parts as the mechanism for tucking the first flap into the box. On account of the position of the flap on the box, however, the movement of the turret cannot be employed to bring the flap into position to be acted upon by this mechanism. For this reason this mechanism is located out of position to engage the flap when the box is brought to this station, and said mechanism is then moved into position to engage the flap.

The mechanism for tucking the flap into the box at this station comprises a bracket 327, a crimper arm 326 pivoted on the bracket, a rod 328 rotatably mounted in the bracket, and a slide 329 mounted to slide in the bracket. All of these parts have the same mode of operation as the corresponding parts of the mechanism for tucking in the first flap.

The mechanism for operating the crimper arm 326 comprises a gear segment 330 secured to the crimper arm, a bellcrank lever 332 pivoted at 334 on the bracket 327 and a gear segment 336 mounted on the bellcrank. The mechanism for rotating the rod 328 comprises a gear 338 secured to the shaft, a rack bar 340, an arm 342 connected with the rack bar, a rock shaft 344, an arm 346, a lever 348 and springs 350 through which the arm 346 is yieldingly actuated from the said lever. The slide 329 is actuated by means of a lever 352 pivoted at 354 on an arm on the bracket 324 and having a slot at its upper end in which is received a pin mounted in said slide.

The mechanism for tucking in the flap is moved forwardly and to the left, Fig. 6, before the box is brought by the turret to this station and after the turret comes to rest this mechanism is moved back into its original or normal position to locate the same in proper position to act on the flap. The bracket 327 is secured to and preferably formed integral with a slide 355 mounted to slide horizontally in a direction substantially parallel with the plane of rotation of the turret in guides formed in a second slide 356 and the latter slide is mounted to slide in suitable guides on the frame in a direction substantially perpendicular to said plane. The slide 355 is actuated through the longitudinal movements of a rod 358 connected therewith and the slide 356 is actuated by the longitudinal movements of a rod 359 connected with the latter slide.

The box is projected from the turret into a chamber 360 formed on a standard 361 located at the rear end of a galley 362 and is then carried from this chamber into the body of the galley. The box is projected from the turret into the chamber 360 by means of a reciprocatory pusher bar 364 mounted to slide in suitable guides in the frame by the side of the slide 329 and arranged to engage the end of the box so as to push the same endwise from the slot 242 into the chamber. The pusher bar is actuated by means of a lever 366 pivoted at 368 on an arm of the bracket 327 and having a slot at its upper end in which a pin carried by the pusher bar engages. The box is carried from the chamber 360 into the end of the galley 362 by means of a lever 370 pivoted at 372 on the standard 361 and having at the end of its upwardly extending arm a projection arranged to pass through an opening in the outer wall of the chamber 360 and engage the outer face of the box. The lever 370 is actuated from a lever 379 pivoted on a shaft 380 one arm of which is connected with the lever 370 by a universal joint.

The mechanism for actuating the lever 268 comprises a link 373 and a lever 374 pivoted on the shaft 386. The lever 374 is connected by a link 375 with a lever 376 pivoted on the shaft 164 and carrying a cam roll 377 engaging in a groove in a cam disk 378 secured to a cam shaft 396.

The mechanism for actuating the lever 305 comprises the lever 379 and a link 381 connecting the lever 379 with the lever 305. The lever 379 in turn is connected by a link 382 with a lever 384 pivoted on a shaft 386. The lever 384 is connected by a link 388 with a lever 390 pivoted on the shaft 164 which carries a cam roll 392 engaging in a cam groove in a cam disk 394 secured to a cam shaft 396.

The mechanism for actuating the lever 320 comprises a lever 400 pivoted on the shaft 380 and a link 402 connecting the lever 400 with the lever 320. The lever 400 in turn is connected, by means of a link 404, with a lever 406 pivoted on the shaft 386 which is connected by a link 408 with a lever 410 pivoted on the shaft 164. The lever 410 carries a cam roll 412 engaging in a groove in a cam disk 414 secured to the cam shaft 396.

The mechanism for actuating the lever 324 comprises a lever 416 pivoted on the shaft 380 and a link 418 connecting the lever 416 with the lever 324. The lever 416 is connected by a link 420 with the lever 352. The latter lever is connected by a link 424 with a lever 426 pivoted on the shaft 164 and carrying a cam roll 428 engaging in a groove in a cam disk 430 secured to the shaft 396.

The mechanism for actuating the lever 332 comprises the lever 384 above described and a link 440 connecting the lever 384 with the lever 332.

The lever 348 is actuated through a link 442 from the lever 406 described above.

The mechanism for moving the rod 358 comprises a lever 446 pivoted on a vertical stud 447 and carrying a cam roll 448 which engages in a groove in a cam disk 450 mounted on the shaft 396.

The mechanism for moving the rod 359 comprises a lever 452 pivoted on the shaft 386 and connected by the rod 359 with the slide. The lever 452 is connected by a link 454 with a lever 456 pivoted on the shaft 164 which carries a cam roll 458 engaging in a groove in a cam disk 460 secured to the cam shaft 396. The lever 366 is actuated through a link 462 from a lever 464 pivoted on the shaft 164. The latter lever carries a cam roll 466 engaging in a groove in a cam disk 468 mounted on the shaft 396.

In adjusting the part 244 of the turret 224 with relation to the part 246 thereof to receive and carry envelopes, the screws 248 are loosened and the part 244 is rotated to the left, Fig. 6, substantially an eighth of a revolution and then secured in position. With this adjustment of the part 244 one of the slots 240 will be brought to an envelope receiving station during each quarter of a revolution of the turret.

The envelopes to be placed in the turret are stacked in an upright galley or chute 480 located at the side of the turret, as clearly shown in Figs. 7 and 11. The envelopes are withdrawn successively from the lower end of the chute by means of a suction head or nozzle 482 secured to the upper end of a vertically movable shaft 484 mounted in guides in the frame, the suction head having a passageway 486 connected with the suction mechanism. The shaft 484 is moved vertically to engage the lower envelope in the stack in the chute and withdraw the same from the chute by means of a lever 488 pivoted on the shaft 386 and engaging between projections on a block 490 mounted on the shaft 484 to slide longitudinally thereon. A coiled spring 492 is interposed between the block and a shoulder on the shaft and the downward movement of the block on the shaft is limited by a nut 491. The lever 488 has a certain amount of overthrow during its upward movement, this overthrow being taken up by the spring 492. The lever 488 is actuated through a link 493 from a lever 494 pivoted on the shaft 164 and carrying a cam roll 495 engaging in a groove in a cam disk 496 secured to a cam shaft 497.

The envelopes are projected from the suction head 482 into the slots in the turret by means of a slide 498 mounted in suitable guides and arranged to engage the flap of the envelope as it lies on the suction head. Before the slide 498 is advanced, however, a gate 500 is projected over the suction head to confine the envelope and prevent the envelope from being deflected laterally or crumpled by the slide. The slide 498 is formed with a downturned outer end which is secured to the inner end of a longitudinally slidable rod 502 the outer end of which is supported by a cross head 503 secured to the rod and arranged to slide in suitable guides in the frame. The gate 500 also is formed with a downturned outer end having an opening through which the rod 502 passes and a coiled spring 504 is interposed between the gate and the cross head 503. Upon the rod 502 is slidably mounted a block 506 having projections between which engages the upper end of a lever 508 pivoted on the shaft 386 to which lever oscillatory movements are imparted by mechanism hereinafter described. When the slide 498 and gate 500 are both retracted, the parts occupy substantially the positions shown in Fig. 7, the coiled spring 504 being compressed and the rearward movement of the slide 498 being limited by a stop 512. As the upper end of the lever 508 swings to the right the slide 498 is held stationary by the spring 504 and the gate 500 is advanced by the spring until the block 506 engages a nut 514 mounted on the forward end of the rod 502. As the movement of the lever continues the slide 498 is moved forwardly to project the envelope from the top of the suction head 482, the gate 500 then being held stationary by the engagement of the forward end thereof with the turret 224. The reverse movement of the lever restores the parts to the positions shown in the drawing.

The mechanism for actuating the lever 508 comprises a link 515 and a cam lever 517 pivoted on the shaft 164 and carrying a cam roll 518 engaging in a groove in a cam disk 519 secured to the shaft 497.

The envelope after it is thus inserted endwise in the turret is gripped between relatively movable gripping jaws 520 and 521 each having V-shaped recesses to receive the respective edges of the envelope. Each of the gripping jaws 521 is slidably mounted in the turret and is normally held in its innermost position determined by suitable stops by means of coiled springs 522. As a slot 240 is carried into loading position by the movement of the turret, the jaw 521 is moved away from the jaw 520 by the engagement of a pin 523 mounted on the frame with the bevelled end of a pin 524 secured to the movable jaw. As the envelope is carried away from the loading station by the movement of the turret the jaw 521 is moved yieldingly toward the jaw 520 thereby opening the envelope.

The next quarter of a revolution of the turret after each period of rest thereof carries the envelope inserted therein at the loading station to a station at which no operation is performed. The next quarter of a revolution of the turret, however, carries the envelope to a station in which the gummed flap of the envelope is moistened, the envelope is projected from the turret the flap is cemented to the body of the envelope, a gummed strip is applied to the envelope over the flap and the envelope is inserted in a receiving galley.

As the envelope is carried toward this station the gummed flap of the envelope is moistened by a wick 526 dipping into a tank 528 partially filled with water and having its upper end secured in position to engage the flap of the envelope which projects to the right, Fig. 12, from the turret. The continued movement of the turret carries the flap of the envelope into engagement with the adjacent end of a lever 530 pivoted at 532 on the frame. At this time the left hand end of the lever 530 is swung upwardly, thereby carrying the same past the envelope flap and is then swung downwardly into engagement with the flap of the envelope so that as the turret comes to rest the flap is bent downwardly at an angle to the body of the envelope and the end of the lever 530 is located opposite the adjacent end of the envelope. The lever 530, the body of which comprises two spaced parallel arms, as clearly shown in Fig. 13, is formed at its end adjacent the turret 224 with a passageway 534 through which the envelope is passed as it is projected from the turret, the envelope passing onto a table 536 between the arms of the lever 530 after being discharged from the passageway 534. The envelope is projected from the turret through the passageway 534 by means of a reciprocatory slide 538 actuated from a lever 540 pivoted at 542 on the frame.

By the passage of the envelope through the passageway 534, the flap on the envelope is bent down against the body of the envelope and is cemented thereto. While the envelope rests on the table 536 it is located over a vertically movable plunger 544 secured to the upper end of a rod 546 both mounted in suitable guides in the frame, the table having an opening through which the plunger is adapted to pass. The gummed strip material to be applied on the envelope is carried on a roll 548 and is led therefrom about guide rolls 550 and 552, over the surface of a table 554 having a groove to receive the same and between feed rolls 556 and 588.

The roll 548 is journaled on a stud 560 secured in an arm on the frame of the machine and is acted upon by a pivoted brake-bar 562 engaging between the sides of the roll and contacting with the gummed strip indicated at S so as to retard the rotation of the roll. The strip is fed by means of the feed rolls 556 and 558 to project the end thereof across a part of the table 554 and over the upper end of the plunger 544 while the plunger is in lowered position. The feed roll 556 is actuated to feed the strip by means of a lever 570 pivoted by the side of the roll on the stud 572 which carries the roll. Oscillatory movements are imparted to the lever 570 and as the lever swings to the right, Fig. 12, the lever is clutched to the feed roll 558 by means of a clutch roll 574 mounted in an inclined bore in one arm of the lever and arranged to engage the outer face of the feed roll, the clutch roll being held in engagement with the feed roll by a suitable spring. The lever 570 is oscillated to impart feeding movements to the feed roll 558 by means of an arm 576 mounted on a rock shaft 578 and a link 580 pivotally connected at one end with the lever 570 and passing at its other end through an opening in the arm 576 and having nuts 582 mounted thereon on opposite sides of the latter lever to engage therewith.

As the strip is fed forward over the plunger 544, the strip is moistened as it passes over the table 554 by means of a wick 584 dipping into a tank 586, preferably filled with water, and passing downwardly through a tube 588 to a point over said table.

After the gummed strip has been fed forward by the feed rolls that part of the strip extending over the plunger 544 is severed from the remainder of the strip and the plunger is moved upwardly to apply the severed portion of the strip to the envelope resting on the table 536. The mechanism for severing the strip comprises a stationary shear blade 590 under which the strip is passed and a movable shear blade 592 secured to the upper end of a vertically movable rod 594. The plunger 544 is moved vertically, in the manner described, by means of a bell crank lever 596 pivoted on the shaft 578, the horizontal arm of which engages between projections on a block 598 secured to the lower end of the rod 546. The rod 594 passes loosely through an opening in the block 598 and a coiled spring 600 is interposed between the block and a collar 602 secured to the rod, the upward movement of the rod with relation to the block being limited by a stop nut 604 threaded on the lower end of the rod. Thus the rod 594 is moved vertically to actuate the shear blade 592 from the movements of the block 598, the blade being yieldingly actuated through the spring 600 during the upward movement of the block.

The envelopes are carried upwardly by the plunger 544 into a position above a slide 606 which lies in retracted position during the upward movement of the plunger. The slide is then advanced beneath the envelope resting on the plunger, the forward end of the slide being formed to straddle the plunger, as shown in Fig. 13 so that as the plunger descends the envelope is left resting on the upper surface of the slide. The slide 606 slides on the upper surface of the table 536 and is moved rearwardly as an envelope is projected through the passageway 534 in the lever 530, allowing the latter envelope to pass beneath the lowermost envelope previously supported on the slide. The slide 606 is actuated from the lever 576 which engages at its upper end in slots in the slide, as shown in Fig. 12.

After a certain number of envelopes have accumulated on the slide 606 the uppermost envelope it tilted into an upright position and is then inserted in a receiving galley. The galley into which the envelopes are inserted is indicated at 608 and consists of a trough-shaped member removably mounted in a groove 610 formed in the frame of the machine and provided at its inner end with retaining pawls 612 similar to those of the supply galleys for holding the envelopes in position. The mechanism for projecting the envelopes from the slide 606 into the galley comprises a plunger 614 mounted to slide in the frame of the machine and a plow 616 mounted to slide with the plunger. The plunger 614 is secured to the left hand end, Fig. 6 of a rod 618 mounted to slide in a bracket 620 and the plow 616 has a substantial U-shape in plan and embraces the sides of the plunger, as clearly shown in Fig. 13. The cross plate of the plow which extends across the rear end of the plunger is formed with an opening through which the rod 618 passes loosely and a coiled spring 622 is interposed between the plow and a collar 623 secured to the rod 618. The rod 618 is reciprocated to actuate the plunger and plow by means of an arm 624 secured to a rock shaft 625 and engaging between flanges on a collar 626 secured to the rod 618.

The plunger and plow have the following mode of operation: As the rod 618 is moved to the left, Fig. 6, the plunger and plow are moved to the left together and the ends of the topmost envelope of the stack resting upon the slide 606 are engaged by the spaced arms of the plow and tilted into an inclined position. After the plow reaches a predetermined position the forward movement thereof is stopped by its engagement with one or more stop pins 627, and the movement of the plunger continues independently of the plow. This movement of the plunger tilts the envelope still further substantially into an upright position and carries the envelope into the galley, the retaining pawls being pushed back by the engagement of the ends of the envelope with the bevelled ends of the pawls.

The mechanism for actuating the lever 530 in the manner described comprises a rod 628 and a lever 630 pivoted on the shaft 164 and carrying a cam roll 632 engaging in a groove in a cam disk 634 secured to the shaft 497.

The mechanism for actuating the lever 540 to actuate the slide 538 comprises a link 636 and a lever 638 pivoted on the shaft 164 and carrying a cam roll 640 engaging a groove in a cam disk 642 mounted on the shaft 497.

The arm 576 is secured to the rock shaft 578 and to the rock shaft is also secured an arm 644 which is connected by a link 646 with a lever 648 pivoted on the shaft 164. The lever 648 carries a cam roll 650 engaging in a groove in a cam disk 652 secured to the cam shaft 497.

The lever 596 is actuated to elevate and depress the shaft 546 through a link 654 from a lever 656 pivoted on the shaft 164 which carries a cam roll 658 engaging in a groove in a cam disk 660 mounted on the cam shaft 497.

The mechanism for actuating the rock shaft 625 and the arm 624 to operate the plunger 614 and plow 616 comprises an arm 662 secured to the rock shaft, and a link 664 connecting said arm with a cam lever 666 pivoted on the shaft 164. This cam lever carries a cam roll 668 engaging in a groove in a cam disk 670 secured to the cam shaft 497.

The passage 486 in the suction head 482 is connected by a pipe 672 with a valve casing 674 in which operates a valve plunger 676 having a groove therein and a spring 678 is arranged to act on the plunger to maintain the same normally in closed position. The movements of the valve plunger are produced and controlled by means of a lever 680 pivoted on the shaft 164, one arm of which engages the plunger and the other of which carries a cam roll 682 arranged to engage the periphery of the cam disk 519.

The valve casing 133 is connected by a pipe 686 with a T-union 688 leading to the suction chamber of a suction pump 690. The valve casing 674 is connected by a pipe 692 with the T-union 688. The pump 690 may have any suitable construction, and, therefore, is not illustrated in detail in the drawing. The pump shown is one of the reciprocating piston type.

In order that each of the turrets may be held stationary while the operations are being performed at the various stations, mechanism is provided for locking each turret in position during its period of rest. The mechanism for locking the upper turret 72 comprises a vertically movable locking bolt 694 mounted in guides in the frame, the tapered upper end of which is arranged to engage in a correspondingly tapered bushing 695 secured in the turret. The mechanism for reciprocating the locking bolt 694 to lock and unlock the turret comprises a rod 696 pivotally connected with the lower end of the bolt and a lever 698 pivoted on the shaft 125. The lever 698 has a certain amount of overflow in a direction to force the locking bolt into the bushing 695 to insure a secure locking of the turret, the excess movement of the lever being taken up by a coiled spring. The rod 696 carries at its lower end a pin 700 engaging in a slot in the lever 698 and a spring 702 is interposed between a washer 704 mounted to slide on the rod and a washer 706 held by a nut 708 from movement on the rod, the lever being arranged to engage the lower side of the washer 704, as shown in Fig. 14. The mechanism for locking the turret 128 comprises a locking bolt 718 slidably mounted in the frame and having a tapered end arranged to be inserted in a bushing 719 carried by the turret 128. The locking bolt 718 is actuated in a manner similar to the locking bolt 694. The locking bolt 718 is reciprocated by means of a lever 720 pivoted at 722 and connected by a rod 724 with the lever 698. The rod 724 carries a pin 726 engaging in a slot in the lever 720 and a spring 728 is interposed between a washer 730 mounted to move longitudinally on the rod and a washer 732 secured to the end of the rod, the washer 730 engaging the lever 720, as shown in the drawing. The mechanism for locking the turret 224 comprises a locking bolt 734 slidably mounted in the frame, the tapered end of which is arranged to engage in a correspondingly tapered bushing 736 secured in said turret. The locking bolt is reciprocated by means of an arm 738 secured to a rock shaft 740 and engaging in a recess in the locking bolt. To the rock shaft 740 is secured a second arm 742 connected by a rod 744 with the lever 698. Mounted on the rod 744 is a pin 746 engaging in a slot in said arm 744 and a spring 748 is interposed between a washer 750 mounted for longitudinal movement on the rod, and a washer 752 secured to the end of the rod, the washer 750 being engaged by the arm 742. This mechanism has a mode of operation similar to the mechanism for operating the bolts 718 and 794. The engagement of the tapered ends of the locking bolts with the bushings mounted in the respective turrets assists in locating the turrets accurately in the proper positions for the loading, unloading and other operations.

The driving mechanism for the machine comprises a main driving shaft 754 which may be driven by a motor 756 or from any other suitable source of power and which carries a pinion 758 meshing with a gear 760 secured to a shaft 762. To the shaft 762 is secured also a worm 764 meshing with a worm gear 766 secured to the shaft 186. The shaft 170 is driven from the shaft 186 through intermeshing bevelled gears 768. The shaft 396 by which certain parts of the machine are operated when the turret 224 is loaded with boxes, is held stationary when the shaft 497 by which certain parts of the machine are operated when the turret 224 is loaded with envelopes, is in operation, and vice versa. The shafts 396 and 497 are adapted to be driven alternatively from the shaft 170 through intermeshing spur gears. As shown in the drawing, the shaft 396 is connected to be driven from the shaft 170 and the shaft 497 is out of operation. The shaft 170 is shown as connected with the shaft 396 by means of a gear 770 secured to the shaft 170 and a gear 772 secured to the shaft 396. The gear 772 is secured to the shaft 497 by means of a nut 773 and the gear may be removed from the shaft and secured to the shaft 497 to connect the latter shaft with the shaft 170 when the latter shaft is to be driven.

In order that either of the shafts 497 and 396 when out of operation may not be angularly displaced, means is provided for locking either of the shaft 497 or 396 from angular movement when it is out of operation. This mechanism comprises a lever 774 secured to a rock shaft 776, one arm of which is formed with an upturned projection arranged to engage in a slot 778 in the cam disk 450. The other arm of a lever is formed with the corresponding projection arranged to engage in a slot 780 in a disk 782 secured to the shaft 497. This lever is arranged so that when it is in either of its extreme angular positions, the projection on one arm will be engaged with one of the slots 778 and 780, while the projection on the other arm will be disengaged from the other slot, and that when it is in an intermediate position both projections will be engaged in the corresponding slots. With this locking mechanism, when one of the shafts 396 and 497 have been in operation and it is desired to connect up the other shaft with the shaft 170, the shaft in operation is first brought to a position with the corresponding slot opposite the projection on the lever 774 and the lever is then actuated to engage the projection in this slot and to disengage the other projection from the other slot, thereby unlocking the other shaft. Thus it will be seen that the shaft which has been out of operation cannot be unlocked until the shaft which is in operation has been turned to proper position and locked by the locking lever. After the shaft to be operated is unlocked, the gear 772 is shifted to the latter shaft to connect the same with the shaft 170. The rock shaft 776 carries an arm 784 upon which is pivoted a latch lever 786 arranged to operate a sliding latch pin 788 adapted to engage in one of three openings 790 in the frame to hold the locking lever in either of its extreme positions or in its intermediate position. The locking of the shaft which is out of operation from angular displacement, insures that this shaft will be connected in its proper time relation with the shaft 170 when again placed in operation.

While the machine embodying the invention in its preferred form as illustrated in the drawings is constructed and designed particularly for packaging safety razor blades, certain features of the invention may be employed with advantage in machines for packaging other blade-like articles. It is to be understood, therefore, that in the claims of the present application the term "blades" is not limited to articles coming under this term as strictly construed, but that it applies also to blade-like articles other than blades. It is also to be understood that, except as defined in the claims, the invention is not limited to the particular construction and arrangement of parts of the illustrated embodiment of the invention, but that it may be embodied in other forms within the scope of the claims.

What I claim as new is:

1. A machine for packaging blades having, in combination, means for inserting blades between the leaves of a book, means for inserting the book in an envelope and means for inserting the filled envelope in an enclosing member.

2. A machine for packaging blades, having in combination, means for supporting and feeding a continuous book strip, means for inserting blades between the leaves of the book strip adjacent the end thereof, means for inserting the filled end portion of the book strip in an enclosing member and means for cutting off the end portion of the book strip.

3. A machine for packaging blades having, in combination, means for supporting and feeding a continuous book strip, means for inserting blades between the leaves of said strip adjacent the end thereof and means for cutting off the end portion of the book strip containing the blades.

4. A machine for packaging blades having, in combination, a movable carrier, means for feeding envelopes into the carrier, means on the carrier for opening the envelopes, means for supporting a filler, means for inserting blades in the filler, means for inserting the blade containing filler in the envelopes while they are held in the carrier and means for rotating the carrier.

5. A machine for packaging blades having, in combination, a movable carrier, a series of blade supply holders, means for discharging a blade from each of said supply holders into the carrier at adjacent points therein to form a group of blades and means for discharging from the carrier all the blades of said group, both said discharging means being constructed and arranged to prevent the dulling of the edges of the blades during the handling thereof.

6. A machine for packaging blades having, in combination, a movable carrier, a series of blade supply holders, means for discharging a blade from each of said supply holders at adjacent points in said carrier to form a group of blades, means for locating a blade receiving book in position to receive the blades of said group and means for discharging the blades of said group from the carrier and conducting them respectively between the several leaves of the book.

7. A machine for packaging blades, having in combination, a movable carrier, a blade supply holder arranged to discharge blades successively into said carrier, means for supporting an article receiving book in position to receive the respective blades from the carrier between the several leaves and means for actuating the carrier.

8. A machine for packaging blades, having, in combination, a series of blade supply holders, a movable carrier arranged to receive blades from said supply holders, means for discharging successively the blades from each of said supply holders into the carrier, means for discharging the blades from the carrier and means for moving the carrier, said carrier and discharging means being constructed and arranged to prevent a dulling of the edges of the blades during the handling thereof.

9. A machine for packaging blades having, in combination, a movable blade carrier, means on the carrier for holding blades, means for supporting a book in position to receive blades from the carrier, means for causing the discharge of the blades held on the carrier respectively between the several leaves of the book and means for moving the carrier.

10. A machine for packaging blades having, in combination, a movable carrier having a series of adjacent slots, a series of blade galleys arranged to discharge blades successively into said slots, means for supporting a book in position to receive blades from said carrier, a series of chutes arranged to receive the blades from said slots and conduct the same between the leaves of the book and means for causing the simultaneous discharge of the blades from the slots into said chutes.

11. A machine for packaging blades having, in combination, a rotary turret, a series of blade galleys arranged radially of said turret, a series of groups of blade receiving slots formed in said turret, means for discharging successively a blade from each of said galleys into a slot of each of said groups during each cycle of operations, means for locating a book in position to receive the blades from said slots, and means for discharging all of the blades in one group of slots simultaneously and conducting the same between the leaves of the book.

12. A machine for packaging blades having, in combination, an envelope support, means for compressing the envelope in the plane thereof to open the same, and means for inserting a blade containing filler in the envelope while it is thus held in open condition.

13. A machine for packaging blades having, in combination, an envelope support, relatively movable jaws for engaging the opposite edges of an envelope and compressing the same in the plane of the envelope to open the envelope, means for opening and closing said jaws and means for inserting a blade containing filler in the envelope while held in an open condition.

14. A machine for packaging blades, having in combination, means for supporting a book strip, means for inserting blades between the leaves of the book strip, means for feeding the book strip and means for cutting the book strip into sections.

15. A machine for packaging blades having, in combination, a movable carrier, means on the carrier for supporting an enclosing member, means for supporting a book strip, means for feeding the end of the book strip into the enclosing member supported on said carrier and means for cutting off the end of the book strip.

16. A machine for packaging blades, having in combination, a movable carrier, means on the carrier for suporting an enclosing member, means for supporting and positioning a book strip, means for inserting blades between the leaves of the book strip adjacent the end thereof, means for feeding the book strip to insert the filled end thereof within an enclosing member supported on the carrier and means for cutting off the filled end of the book strip.

17. A machine for packaging blades having, in combination, a galley for containing a pack of enclosing members placed face to face, a carrier mounted to rotate about a fixed axis and having a series of slots for holding said enclosing members, means for transferring said members successively from the galley to the carrier and means for actuating the carrier.

18. A machine for packaging blades, having in combination, a movable carrier, means on said carrier for holding boxes, means for supporting a filler, means for inserting blades in the filler, means for inserting the blade containing fillers in said boxes while the boxes are held in the carrier and means for actuating the carrier.

19. A machine for packaging blades having, in combination, a movable carrier, means on the carrier for holding boxes having projecting flaps at the opposite ends thereof, means for supporting a filler, means for inserting blades in the filler, means for inserting the blade containing filler in the boxes while the boxes are held in the carrier, means for tucking in the flaps at both ends of each of the boxes while the boxes are held in the carrier and means for actuating the carrier.

20. A machine for packaging blades having, in combination, a movable carrier, means on the carrier for holding envelopes, means for moistening the flap of an envelope while it is held on the carrier, means for pressing the flap against the body of the envelope as the envelope is discharged from the carrier and means for actuating the carrier.

21. A machine for packaging blades having, in combination, means for supporting an envelope, means for inserting a blade containing filler in the envelope and means for applying a gummed strip across the flap and body of the envelope.

22. A machine for packaging blades having, in combination, a movable carrier, means on the carrier for holding an envelope, means for placing the envelope in the carrier, means for moistening the flap of the envelope while it is held from the carrier, a device having a narrow passage located adjacent the carrier and means for projecting the envelope from the carrier through said passage to press the flap of the envelope against the body thereof.

23. A machine for packaging blades, having in combination, means for supporting an envelope, means for inserting a blade containing filler in the envelope, means for moistening the flap of the envelope, a device having a narrow passage and means for passing the filled envelope through said narrow passage to press the flap of the envelope against the body thereof.

24. A machine for packaging blades, having in combination, a plunger, means for placing a section of gummed strip material over the plunger, means for projecting an envelope over the plunger and means for actuating the plunger to apply said section of strip material to the envelope.

25. A machine for packaging blades having, in combination, a support adapted to receive blade enclosing members, means for depositing enclosing members on said support in a horizontal position, a receiving galley, and means for tilting said enclosing members into a substantially vertical position and depositing the same in said galley.

26. A machine for packaging blades, having in combination, a support adapted to receive blade enclosing members, means for depositing said members on said support in a substantially horizontal position, a receiving galley, a plow for engaging said members and tilting the same into a substantially vertical position, a plunger for projecting said members into the galley and means for actuating the plow and plunger.

27. A machine for packaging blades having, in combination, means for holding a number of blades, means for supporting a book, and blade handling mechanisms constructed and arranged to take the blades successively from the blade holding means and deposit the same respectively between the several leaves of the book.

28. A machine for packaging blades having, in combination, a movable carrier, means for supporting a filler, means for inserting blades in the filler, means on the carrier for holding blade containing fillers, means for inserting fillers in the carrier, a second movable carrier arranged to move adjacent the first carrier, means on the second carrier for holding enclosing members, and means for inserting the fillers carried by the first carrier into the enclosing members carried by the second carrier.

29. A machine for packaging blades having, in combination a galley adapted to hold a pack of substantially flat blade-like members placed face to face, a passage adjacent the end of said galley, a device arranged to carry said members successively from the galley into said passage, a gate, a slide arranged to engage an edge of each of said members to project the same from the passage, and means for first projecting said gate into the passage at the side of a member therein and for then actuating the slide to project said member from the passage.

30. In a machine for packaging blades, in combination, means adapted to support a book having several leaves, and means to insert a razor blade in each of several pockets formed between the leaves, said blades lying therein side by side.

31. In a machine for packaging blades, in combination, means adapted to support a book having several leaves, and means to insert a razor blade in each of several pockets formed between the leaves, said blades lying therein side by side with their sharpened edges up.

32. In a machine for packaging blades, in combination, means adapted to support a book having several leaves and means to insert a razor blade in each of several pockets formed between the leaves, said blades lying therein side by side, and means then to insert the book into an envelope.

33. A machine for packaging blades having, in combination, means for supporting a book having several leaves and means for inserting several razor blades between the leaves of the book so that the blades lie side by side in the book but separated by the leaves of the book.

34. A machine for packaging blades having, in combination, a galley arranged to hold a pack of blades placed face to face, means for supporting a book in position to receive blades from said galley and means for discharge blades successively from said galley between the leaves of said book, said galley and discharging means being constructed and arranged to prevent dulling of the sharpened edges of the blades during the handling thereof.

35. A machine for packaging blades having, in combination, means for assembling a series of blades side by side but spaced from each other and means constructed and arranged to insert the blades of said series in between the open leaves of a book held adjacent thereto.

36. A blade packaging machine having, in combination, a plurality of blade holders each constructed to hold several blades, means to hold open the leaves of a book and means to discharge a blade from each blade holder into a separate pocket of said book so that the blades lie therein side by side.

37. A blade packaging machine having, in combination, a plurality of blade holders each constructed to hold several blades, means to hold open the leaves of a book and means to discharge a blade from each blade holder into a separate pocket of said book.

38. A blade packaging machine having, in combination, a plurality of blade holders each adapted to hold several blades, means for supporting a continuous book, means for feeding the book longitudinally and means for discharging a blade from each holder into a separate pocket formed between the leaves of said book.

39. A blade packaging machine having, in combination, means for holding a supply of blades, means for taking blades singly from the supply and placing each in a separate cover, said means being constructed and arranged to prevent injury to the sharpened edges of the blades during the handling thereof.

40. A blade packaging machine having, in combination, means for holding a supply of blades, means for taking blades singly from the supply and placing each in a separate cover, constructed and arranged to prevent injury to the blades during the handling thereof and means for placing the covered blades within a wrapper.

41. A blade packaging machine, having, in combination, means for supporting a book in open position, means for holding a supply of sharpened razor blades and means for taking blades singly in succession from the supply and placing the same between the leaves of the book constructed and arranged to prevent injury to the blade edges during the handling thereof.

Signed at New York, N. Y. this 1st day of February 1921.

FERDINAND G. HENRY.

said galley and discharging means being constructed and arranged to prevent dulling of the sharpened edges of the blades during the handling thereof.

35. A machine for packaging blades having, in combination, means for assembling a series of blades side by side but spaced from each other and means constructed and arranged to insert the blades of said series in between the open leaves of a book held adjacent thereto.

36. A blade packaging machine having, in combination, a plurality of blade holders each constructed to hold several blades, means to hold open the leaves of a book and means to discharge a blade from each blade holder into a separate pocket of said book so that the blades lie therein side by side.

37. A blade packaging machine having, in combination, a plurality of blade holders each constructed to hold several blades, means to hold open the leaves of a book and means to discharge a blade from each blade holder into a separate pocket of said book.

38. A blade packaging machine having, in combination, a plurality of blade holders each adapted to hold several blades, means for supporting a continuous book, means for feeding the book longitudinally and means for discharging a blade from each holder into a separate pocket formed between the leaves of said book.

39. A blade packaging machine having, in combination, means for holding a supply of blades, means for taking blades singly from the supply and placing each in a separate cover, said means being constructed and arranged to prevent injury to the sharpened edges of the blades during the handling thereof.

40. A blade packaging machine having, in combination, means for holding a supply of blades, means for taking blades singly from the supply and placing each in a separate cover, constructed and arranged to prevent injury to the blades during the handling thereof and means for placing the covered blades within a wrapper.

41. A blade packaging machine, having, in combination, means for supporting a book in open position, means for holding a supply of sharpened razor blades and means for taking blades singly in succession from the supply and placing the same between the leaves of the book constructed and arranged to prevent injury to the blade edges during the handling thereof.

Signed at New York, N. Y. this 1st day of February 1921.

FERDINAND G. HENRY.

Certificate of Correction.

It is hereby certified that in Letters Patent No. 1,580,247, granted April 13, 1926, upon the application of Ferdinand G. Henry, of North Philadelphia, Pennsylvania, for an improvement in " Blade-Packaging Machines," errors appear in the printed specification requiring correction as follows: Page 2, line 73, for " th " read *the;* page 3, line 84, for the word " bade " read *blade;* page 10, line 62, after the word " turret " insert a comma; same page, line 109, for the word " on " read *to,* and line 114, for the numeral " 588 " read *558;* page 11, line 76, for the word " it " read *is;* page 12, line 63, for the word " overflow " read *overthrow;* page 15, line 129, claim 34, for the word " discharge " read *discharging;* and that the said Letters Patent should be read with these corrections therein that the same may conform to the record of the case in the Patent Office.

Signed and sealed this 11th day of May, A. D. 1926.

[SEAL.]
M. J. MOORE,
*Acting Commissioner of Patents.*

Certificate of Correction.

It is hereby certified that in Letters Patent No. 1,580,247, granted April 13, 1926, upon the application of Ferdinand G. Henry, of North Philadelphia, Pennsylvania, for an improvement in "Blade-Packaging Machines," errors appear in the printed specification requiring correction as follows: Page 2, line 73, for "th" read *the;* page 3, line 84, for the word "bade" read *blade;* page 10, line 62, after the word "turret" insert a comma; same page, line 109, for the word "on" read *to,* and line 114, for the numeral "588" read *558;* page 11, line 76, for the word "it" read *is;* page 12, line 63, for the word "overflow" read *overthrow;* page 15, line 129, claim 34, for the word "discharge" read *discharging;* and that the said Letters Patent should be read with these corrections therein that the same may conform to the record of the case in the Patent Office.

Signed and sealed this 11th day of May, A. D. 1926.

[SEAL.]
M. J. MOORE,
*Acting Commissioner of Patents.*